US00RE47203E

(19) United States
(12) Reissued Patent
Katzman et al.

(10) Patent Number: US RE47,203 E
(45) Date of Reissued Patent: Jan. 15, 2019

(54) SPRINKLER

(71) Applicant: NAANDANJAIN IRRIGATION LTD., Kibbutz Na'an (IL)

(72) Inventors: Oded Katzman, Haifa (IL); Zohar Katzman, Haifa (IL)

(73) Assignee: NAANDANJAIN IRRIGATION LTD., Kibbutz Na'an (IL)

(21) Appl. No.: 15/391,281

(22) Filed: Dec. 27, 2016

Related U.S. Patent Documents

Reissue of:
(64) Patent No.: 8,998,109
Issued: Apr. 7, 2015
Appl. No.: 13/001,832
PCT Filed: Jun. 30, 2009
PCT No.: PCT/IL2009/000653
§ 371 (c)(1),
(2) Date: Dec. 29, 2010
PCT Pub. No.: WO2010/001392
PCT Pub. Date: Jan. 7, 2010

U.S. Applications:
(60) Provisional application No. 61/129,471, filed on Jun. 30, 2008, provisional application No. 61/193,803, filed on Dec. 24, 2008.

(51) Int. Cl.

| | |
|---|---|
| ***B05B 3/02*** | (2006.01) |
| ***B05B 3/04*** | (2006.01) |
| ***B05B 3/06*** | (2006.01) |
| ***F23D 11/04*** | (2006.01) |
| ***B05B 3/00*** | (2006.01) |

(52) U.S. Cl.
CPC ..... *B05B 3/0486* (2013.01); *B05B 3/005* (2013.01); *B05B 3/006* (2013.01); *Y10S 239/11* (2013.01)

(58) Field of Classification Search
CPC ..... B05B 3/0486; B05B 3/005; B05B 3/006; Y10S 239/11
See application file for complete search history.

(56) References Cited

U.S. PATENT DOCUMENTS

| | | | | |
|---|---|---|---|---|
| 4,453,673 | A | 6/1984 | Icenbice | |
| 4,660,766 | A | 4/1987 | Nelson et al. | |
| 5,236,126 | A | 8/1993 | Sawade et al. | |
| 5,597,119 | A * | 1/1997 | Gorney et al. | 239/241 |

(Continued)

FOREIGN PATENT DOCUMENTS

| | | | |
|---|---|---|---|
| CN | 2584883 | Y | 11/2003 |
| WO | 2007109298 | A2 | 9/2007 |
| WO | 2010/016053 | | 2/2010 |

OTHER PUBLICATIONS

An English translation of an Office Action dated Oct. 17, 2017 which issued during the prosecution of Brazilian Patent Application No. PI0917506-7.

(Continued)

*Primary Examiner* — Joseph A Kaufman
(74) *Attorney, Agent, or Firm* — Sughrue Mion, PLLC

(57) ABSTRACT

Provided is a rotary sprinkler that includes a housing, a rotatable irrigation head associated with a first magnet assembly, and a second magnet assembly associated with the housing and fitted with a rotary dampening mechanism. The first magnet assembly and the second magnet assembly are arranged with like poles facing each other so as to generate a repulsion force therebetween.

19 Claims, 42 Drawing Sheets

(56) References Cited

U.S. PATENT DOCUMENTS

| | | | | |
|---|---|---|---|---|
| 5,671,886 | A * | 9/1997 | Sesser | B05B 3/005 239/222.21 |
| 5,730,365 | A * | 3/1998 | Messinger | B05B 3/0486 239/222.17 |
| 7,111,796 | B2 * | 9/2006 | Olson | 239/452 |
| 7,287,710 | B1 | 10/2007 | Nelson et al. | |
| 8,998,109 | B2 | 4/2015 | Katzman et al. | |
| 2004/0232701 | A1 | 11/2004 | DeFrank | |
| 2006/0065759 | A1 | 3/2006 | Olson | |
| 2006/0091232 | A1 * | 5/2006 | Grant | 239/19 |
| 2010/0065656 | A1 * | 3/2010 | Grant | 239/222.11 |
| 2011/0114755 | A1 | 5/2011 | Katzman et al. | |

OTHER PUBLICATIONS

An English translation of an Office Action dated Oct. 4, 2016, which issued during the prosecution of Indian Patent Application No. 2789/MUMNP/2010.

The International Search Report for PCT/IL2009/000653, completed on Nov. 26, 2009 and mailed on Dec. 3, 2009; and the Written Opinion for PCT/IL2009/000653; 11 pages total.

* cited by examiner

SPRINKLER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This *is a reissue application of U.S. Pat. No. 8,998,109, which was filed as U.S. patent application Ser. No. 13/001,832 on Dec. 29, 2010 and issued on Apr. 7, 2015, which* is a National Phase Application filed under 35 U.S.C. 371 as a national stage of PCT/IL2009/000653, filed on Jun. 30, 2009, an application claiming the benefit under 35 USC 119(e) of U.S. Provisional Application No. 61/129,471, filed on Jun. 30, 2008, and an application claiming the benefit under 35 USC 119(e) of U.S. Provisional Application No. 61/193,803, filed on Dec. 24, 2008, the content of [each of] which is hereby incorporated by reference in its entirety.

FIELD OF THE INVENTION

This invention relates to rotary sprinklers. More particularly the invention is directed to a rotary sprinkler fitted with a dampening mechanism for controlling the rotary speed of an irrigation head.

BACKGROUND OF THE INVENTION

In rotary sprinklers there is provided an irrigator head/distribution rotor which is rotatable in order to cover a desired land pattern. Rotary motion is imparted by the force of the irrigated media (typically water) acting in conjunction with a rotary mechanism converting some of the stream energy into rotary motion. Such a rotary mechanism could be a water gear, a ball motor, etc.

However, at times it is desired to slow the rotary motion so as to generate a slow and smooth rotary motion, resulting in a uniform precipitation of the irrigated media. Different mechanisms are known in the art for that purpose. For example there are known mechanisms where counter arrangements are provided for generating a reaction force opposite to the desired rotary force. Other arrangements are known for dampening the rotary motion of the irrigation head by utilizing the shear effect of a viscous material. Slowing rotation speed of the sprinkler results in increased irrigation range and homogeneous water precipitation, as well as reducing wear of moving parts.

Yet another arrangement is disclosed in U.S. Pat. No. 7,111,796 to Olson, directed to a sprinkler, comprising: a nozzle having a fluid path formed between an inlet and an outlet, the nozzle rotatably driven by a pressurized flow of fluid along the fluid path; and a housing separating a magnetic drag coupling assembly from the fluid path, the magnetic drag coupling assembly configured to exert a drag force in opposition to the fluid flow force rotating the nozzle; further including a pressure balancing mechanism within the nozzle assembly to generally neutralize any axial force that might otherwise be imparted to the nozzle by the fluid flow wherein the coupling assembly includes a drive magnet and a reactionary magnet positioned that exert an attractive force upon each other, a drag source acting on said reactionary magnet to provide a resistive force to oppose rotation of the nozzle.

U.S. Pat. No. 7,287,710 discloses a nutating-type sprinkler including a sprinkler head incorporating a nozzle; a spool fixed to the sprinkler head in proximity to the nozzle; a cage assembly loosely mounted on the spool, the assembly including a distribution plate at a first end of the assembly downstream of the nozzle and a first magnet at a second opposite end of the assembly upstream of the spool; a mounting element fixed to the assembly between the first and second ends, an inner edge of the mounting element loosely confined between upper and lower flanges of the spool; and a second magnet fixed to the sprinkler head, axially between the spool and the first magnet.

SUMMARY OF THE INVENTION

According to the present invention there is provided a rotary sprinkler wherein rotation dampening of an irrigation head is obtained by magnetic repulsion forces and an associated dampening mechanism.

The invention calls for a rotary sprinkler comprising a housing, a rotatable irrigation head associated with a first magnet assembly; a second magnet assembly associated with the housing and fitted with a rotary dampening mechanism; where said first magnet assembly and said second magnet assembly are arranged with like poles facing each other so as to generate a repulsion force therebetween.

According to a first aspect of the invention there is provided a rotary sprinkler comprising a housing formed with a liquid inlet port, a bridge supporting a pair of first magnets radially offset with respect to a rotary axis of the sprinkler, said first magnets being axially aligned and spaced apart, with their opposite poles facing each other; a rotatable irrigation head supported by said bridge and being in flow communication with a jet forming nozzle being in flow communication with the inlet port; said irrigation head articulated with a second magnet and associated with a rotary dampening mechanism, where said second magnet is co-radial with the first magnets and sandwiched therebetween and is disposed with like poles facing the first magnets so as to generate a repulsion force therebetween.

According to a second aspect of the invention there is provided a rotary sprinkler comprising a housing formed with a liquid inlet port, a rotatable irrigation head comprising a magnet support fixedly fitted with at least one first magnet radially offset with respect to a rotary axis of the irrigation head; said irrigation head being in flow communication with a jet forming nozzle associated with the inlet port; a bridge rotationally supporting said irrigation head and comprising at least one second magnet radially offset and associated with a rotary dampening mechanism; where said at least one first magnet and at least one second magnet are arranged with like poles facing each other so as to generate a repulsion force therebetween.

Any one or more of the following design features may be incorporated in a sprinkler according to the present invention:

- the second magnet is displaceable within a sealed chamber filled with a viscous substance.
- the second magnet is received within a casing displaceable within the sealed chamber, said casing retaining the second magnet at a fixed orientation, to thereby facilitate only rotary displacement thereof.
- the second magnet symmetrically extends between pair of first magnets, at a magnetic force equilibrium.
- the pair of first magnets is fixedly articulated to the irrigation head.

the pair of first magnets and the second magnet are axially fixedly positioned with respect to one another.

the second magnet symmetrically extends between the pair of first magnets, at a magnetic force equilibrium.

the sprinkler is fitted for either heads-up or bottoms-up orientation.

Any one or more of the following design features may be incorporated in a sprinkler according to the second aspect of the invention, though some may apply to the sprinkler according to the second aspect of the present invention:

the repulsion force is coaxial with a rotary axis of the sprinkler and acts to bias the irrigation head in a direction opposite to an axial force applied on the irrigation head by a liquid jet.

the number of first magnets corresponds with the number of second magnets.

the at least one first magnet and the at least one second magnet may have substantially the same magnetic force.

the at least one first magnet and the at least one second magnet may be substantially equally radially offset.

the two first magnets and the two second magnets are symmetrically distributed, namely extend on a diameter of the respective.

the sprinkler is a pop-up type and the irrigation head is fitted with a support boss retained by the bridge and having an axial degree of freedom such that the irrigation head is axially displaceable between a downward, non-operative position and an upper, operative position.

when the irrigation head is at its downward, non-operative position it conceals the jet forming nozzle.

at least one of the irrigation head and the jet forming nozzle is fitted with a peripheral skirt portion for concealing an outlet of the jet forming nozzle and an outlet of a jet emitting portion of the irrigation head, when the irrigation head is at the downward, non-operative position.

the irrigation head is fitted with a skirt portion and the jet forming nozzle is fitted with a fixed skirt portion, said skirt portions being coaxial and having different dimensions, whereby at the non-operative position said skirt portions at least partially overlap.

the at least one second magnet is received within a casing displaceable within the sealed chamber, said casing retaining the at least one second magnet at fixed relation and facilitating only rotary displacement thereof.

the at least one first magnet is fixedly articulated to the irrigation head.

the at least one first magnet is fixed on a magnet support member which is secured to the bridge in a rotatable fashion and in turn is engageable for rotation with the irrigation head.

the magnet support member engages with the irrigation head upon axial displacement of the irrigation head from a downward, non-operative position to an upper, operative position.

rotary engagement between the magnet support member and the irrigation head is facilitated by a helical path formed in one of the magnet support member and the irrigation head and a corresponding helical coupler formed in another of the magnet support member and the irrigation head, whereby axial ascending of the irrigation head entails postponed rotary of the magnet support member.

the rotary dampening mechanism comprises a space control arrangement for altering the sheer force between the at least one second magnet holder and the viscous substance received within the sealed chamber, thus controlling the rotary dampening force.

the space control arrangement comprises an axially displaceable case member, displacement of which entails expansion/contraction of the space of the sealed chamber, said case member comprising a diaphragm sealingly packing said sealed chamber.

the displaceable case member is screw coupled to a casing of the sealed chamber, whereby rotation of the displaceable case member with respect to the casing of the sealed chamber entails axial displacement thereof the at least one first magnet and the at least one second magnet are received in respective magnet holders which are detachably attachable to the irrigation head and bridge, respectively.

first magnet assembly and the second magnet assembly are axially positioned with respect to one another.

the first magnet assembly and the second magnet assembly are radially positioned with respect to one another.

shear forces between a viscous substance of the dampening mechanism reside over one or more substantially horizontal shear surfaces of a second magnet support member accommodating the at least one second magnets.

shear forces between a viscous substance of the dampening mechanism reside over one or more substantially vertical shear surfaces of a second magnet support member accommodating the at least one second magnets.

the sprinkler is fitted for either heads-up or bottoms-up orientation.

the dampening mechanism is formed with a top annular groove and a bottom annular groove and the second magnet support has a T-like cross section laterally extending with respective portions thereof rotatably displaceable within said a top annular groove and a bottom annular groove, respectively.

flow paths are provided in the sealed chamber for flow of the viscous substance, wherein at either the heads-up or bottoms-up orientation of the sprinkler, the viscous substance occupies only a bottom annular groove.

BRIEF DESCRIPTION OF THE DRAWINGS

In order to understand the invention and to see how it may be carried out in practice, embodiments will now be described, by way of a non-limiting example only, with reference to the accompanying drawings, in which:

FIGS. 1 to 4 are directed to a sprinkler according to a first a spect of the present invention, wherein:

FIG. 2 is a longitudinally sectioned top isometric view of the sprinkler seen in FIG. 1;

FIG. 3 is a longitudinally sectioned planer view of the sprinkler of the present invention;

FIGS. 5 to 39 are directed to a sprinkler according to a first aspect of the invention, wherein:

FIG. 5 is a side view of a sprinkler in accordance with an embodiment of the present invention;

FIG. 6 is a top isometric view of the sprinkler seen in FIG. 5;

FIG. 9 is a side view of a sprinkler in accordance with another embodiment of the present invention;

FIG. 10 is a bottom isometric view of a sprinkler seen in FIG. 9;

FIG. 12 is a side view of a sprinkler in accordance with still an embodiment of the present invention, at a non-operative position;

FIG. 13 is a bottom isometric view of the sprinkler of FIG. 8;

FIG. 14 is a longitudinally sectioned bottom isometric view of the sprinkler of FIG. 12;

FIG. 15 is a longitudinally sectioned isometric view of the sprinkler of FIG. 12;

FIG. 16 is a bottom isometric view sectioned longitudinally at a plain perpendicular to that shown in FIG. 14;

FIG. 17 is a longitudinal section of the sprinkler of FIG. 8, at its operative, raised position;

FIG. 18 is a side view of a sprinkler, in accordance with a modification of the sprinkler of the embodiment of FIG. 12, at its non-operative, closed position;

FIG. 19 is a bottom isometric view of the sprinkler seen in FIG. 18;

FIG. 20 is a longitudinal section of the sprinkler of FIG. 18;

FIG. 21 is a top isometric view of the sprinkler of FIG. 18 at its operative, open position;

FIG. 22 is a longitudinally sectioned, bottom isometric view of the sprinkler in the position of FIG. 21;

FIG. 23 is a longitudinally sectioned bottom isometric view of the sprinkler of FIG. 17, sectioned at a plain perpendicular to that illustrated in FIG. 22;

FIG. 24 is a longitudinally section of the sprinkler at the position of FIG. 21;

FIG. 25 is a longitudinal section of the sprinkler of FIG. 18, at its operative, raised position;

FIG. 26 is a longitudinally sectioned view illustrating an adjustable dampening mechanism according to a modification of the invention.

FIG. 28 is a top isometric view of the sprinkler seen in FIG. 27;

FIG. 29 is a sectioned view of FIG. 27;

FIG. 30 is a sectioned, bottom isometric view of the sprinkler of FIG. 27

FIG. 31 is a front view of a sprinkler in accordance with yet an embodiment of the present invention;

FIG. 32 is a bottom isometric view of the sprinkler illustrated in FIG. 27;

FIG. 34 is a top isometric view of the sprinkler of FIG. 27;

FIG. 35 is a bottom isometric view taking along a plane perpendicular to that illustrated in FIG. 29;

FIG. 37 is a sectioned view of the sprinkler of FIG. 23 in an upside irrigating position;

FIG. 39 is a sectioned view illustrating only a top portion of a rotary sprinkler according to yet another embodiment of the present invention.

DETAILED DESCRIPTION OF EMBODIMENTS

Attention is first directed to FIGS. 1 to 4 of the drawings, illustrating a sprinkler according to a first aspect of the present invention.

Figure 1A:
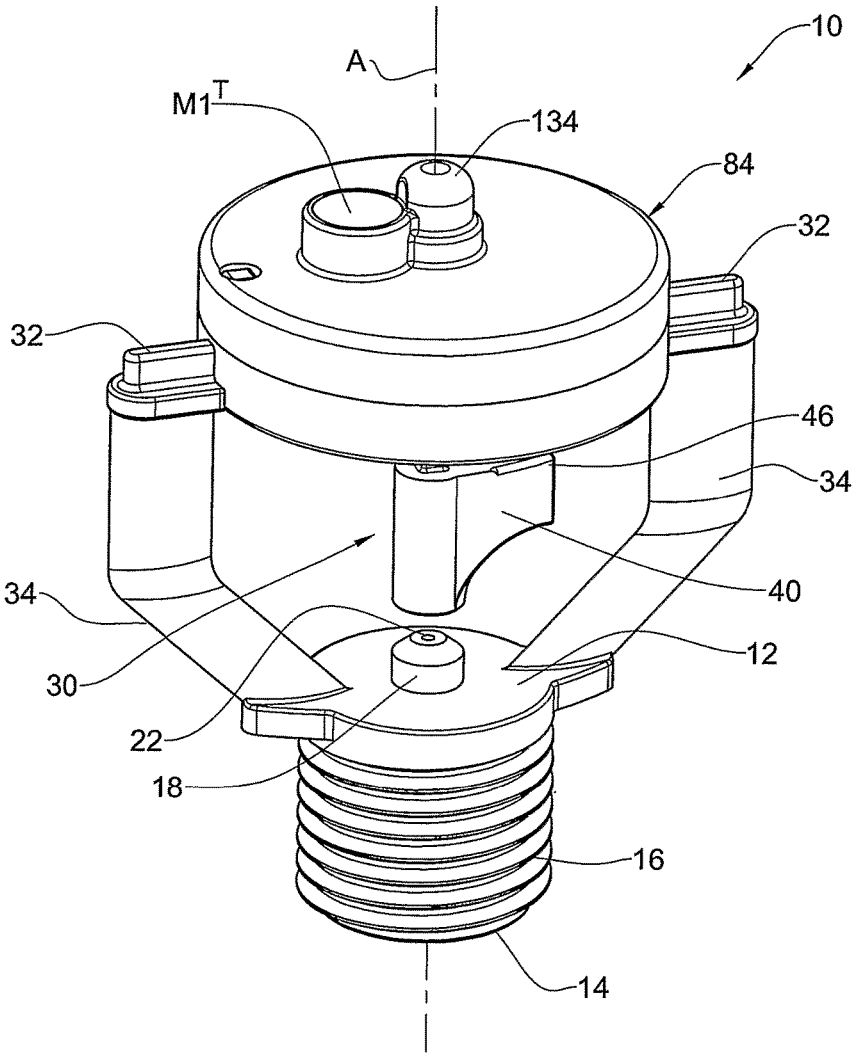
FIG. 1A is a top isometric view of a sprinkler in accordance with the present invention.
Figure 1B:
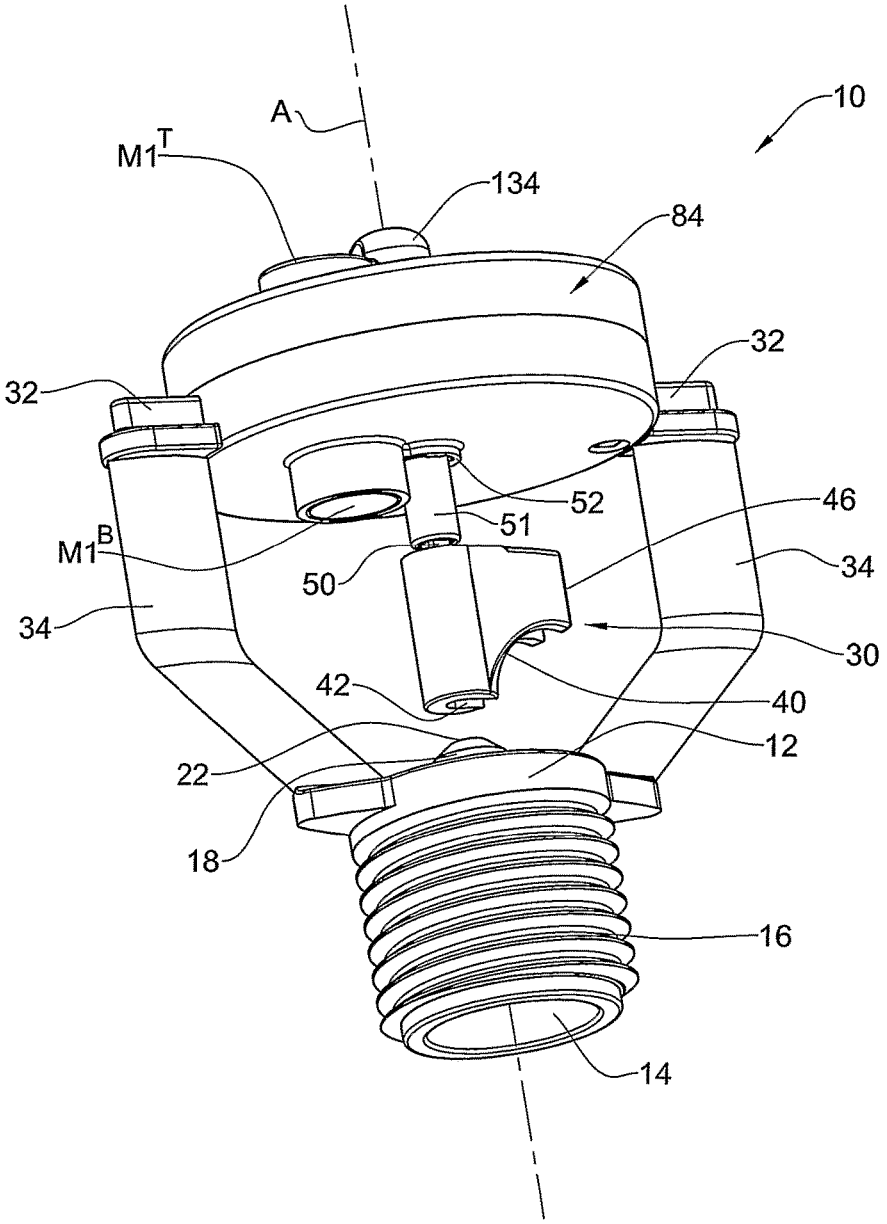
FIG. 1B is a bottom isometric view of the sprinkler seen in FIG. 1A.
Figure 2:
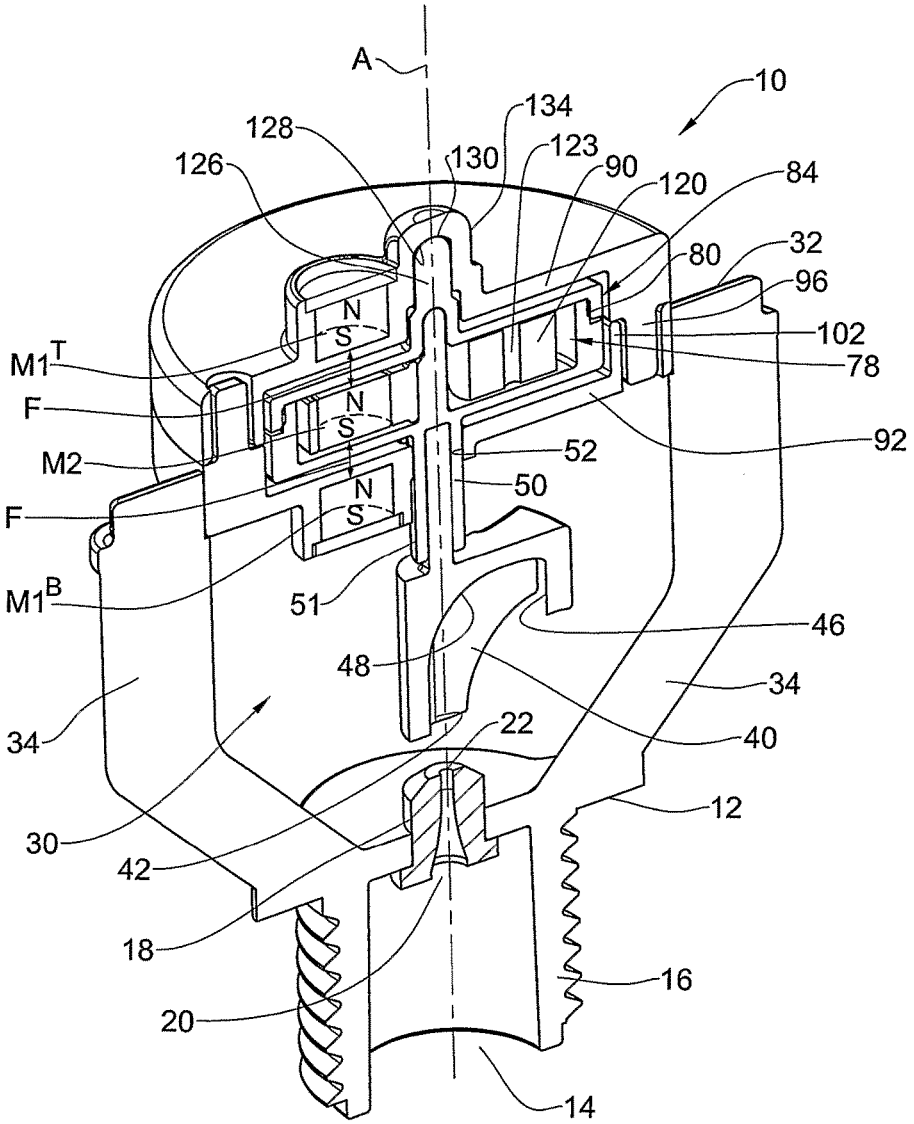

As illustrated in FIGS. 1 and 2 of the drawings there is a rotary sprinkler generally designated 10 in accordance with the invention. The sprinkler comprises a housing 12 which in turn is formed with an inlet port 14 for coupling to a pressurized source of water (not shown) e.g. an irrigation supply line, for example by screw coupling to external threading 16.

A jet forming nozzle 18 extends from the inlet port 14 having an inlet side 20 being in flow communication with inlet port 14 and a jet outlet 22 facing a rotary irrigation head generally designated 30.

Integrally formed with the housing 12 there is a bridge member 32 extending over two support arms 34 disposed in a V-like configuration. The support arms 34 have a blade-like cross section so as to cause minimal interference with a jet emitted from the rotary sprinkler head.

The irrigation head 30 is a swivel-type irrigator formed with a reaction generating deflection groove 40 having an inlet end 42 extending substantially vertically above the outlet 22 of the jet forming nozzle 18, and an outlet opening 46 extending substantially radially, with a reaction generating surface 48 (best seen in FIGS. 2 and 3), designed for imparting the rotary head 30 with rotary motion upon impinging of a water jet emitted from the jet forming nozzle 22 thereupon.

Figure 3:
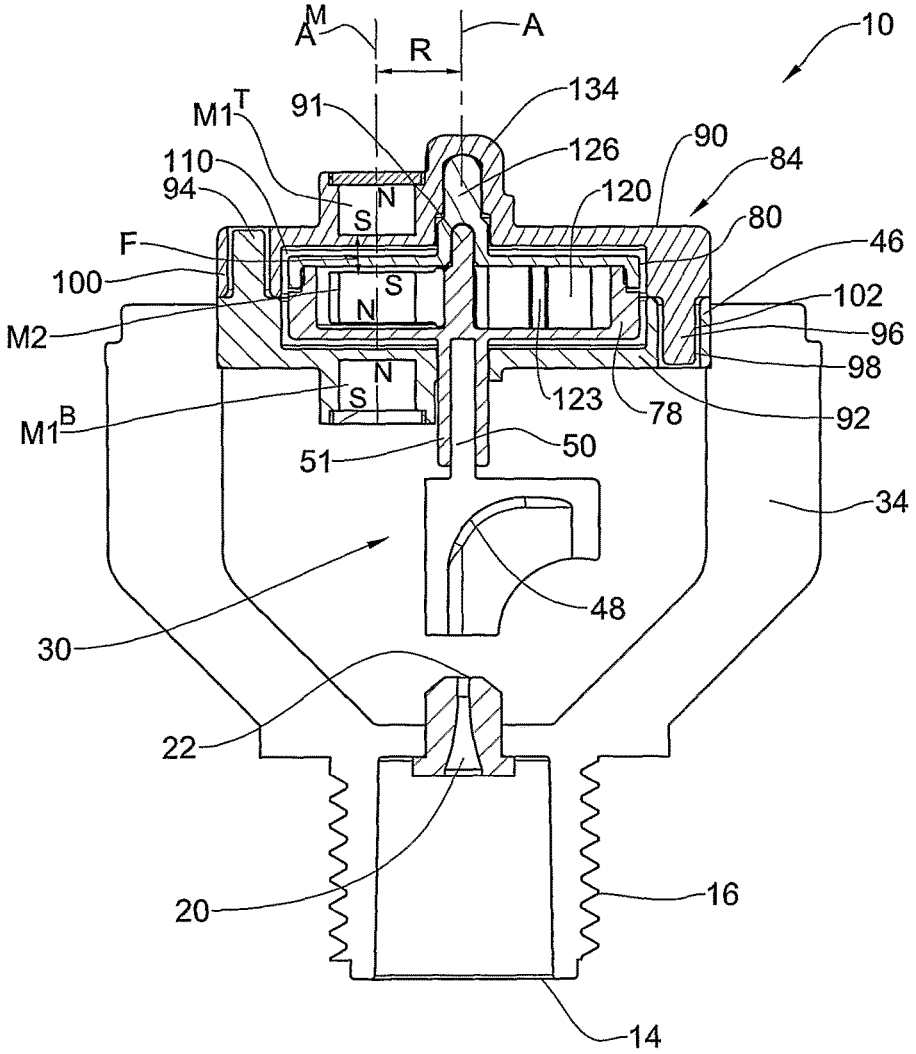

As seen in FIGS. 2 and 3, the irrigation head 30 is fitted with an upwardly extending boss 50 snugly fixed within a downwardly projecting receiving boss 51 of a second magnet support chamber generally designated 80 (FIG. 3). The second magnet support chamber 80 is rotatably received within an enclosure designated 84 extending between the two support arms 34. The enclosure 84 is assembled of a top cover 90 and a bottom cover 92, said covers being fixedly secured to one another and prevented from relative rotation with respect to one another by mutually projecting studs 94 and 96 projecting into oppositely positioned bores 98 and 100 fitted in the covers 90 and 92, respectively.

Each of the covers 92 and 94 fixedly supports a first magnet $M1^T$ and $M1^B$, respectively, said first magnets $M1^T$ and $M1^B$ being coaxially disposed about an axis $A^M$ parallel to a central axis (axis of rotation of the irrigation head 30), designated A, and radially offset at a distance R from the axis A. The first magnets $M1^T$ and $M1^B$ are fixedly set in the respective top and bottom cover and are positioned with their opposite poles facing one another, e.g. as illustrated in the 2, 3, and 4A. Furthermore, the first magnets $M1^T$ and $M1^B$ are of substantially same magnitude and are substantially equidistantly spaced from the enclosure 84.

The second magnet support chamber 80 is composed of a top shield 110 and a bottom shield 112 defining together a sealed space [114]. Received within the chamber [114] *80* there is a second magnet carrier plate 120, freely rotatable about stem 91. The second magnet carrier plate 120 accommodates a second magnet designated M2, which together define a rotary dampening mechanism generally designated 78, as will be explained hereinafter in further detail.

The top shield 110 is fitted with an axially upwardly projecting stem 126 formed with a smooth rounded tip 128, rotatably bearing against a smooth bearing surface 130 correspondingly formed at a support receptacle 134 of the top cover 90. Likewise, the bottom shield 112 is integrated with the downwardly projecting receiving boss 51 which is received within an opening 52 formed in the bottom cover 92, so as to provide a bushing support for the rotating boss 51. This arrangement results in that the second magnet support chamber 80 is maintained within the enclosure 84, free to rotate about the central axis A however axially supported.

Figure 4A:
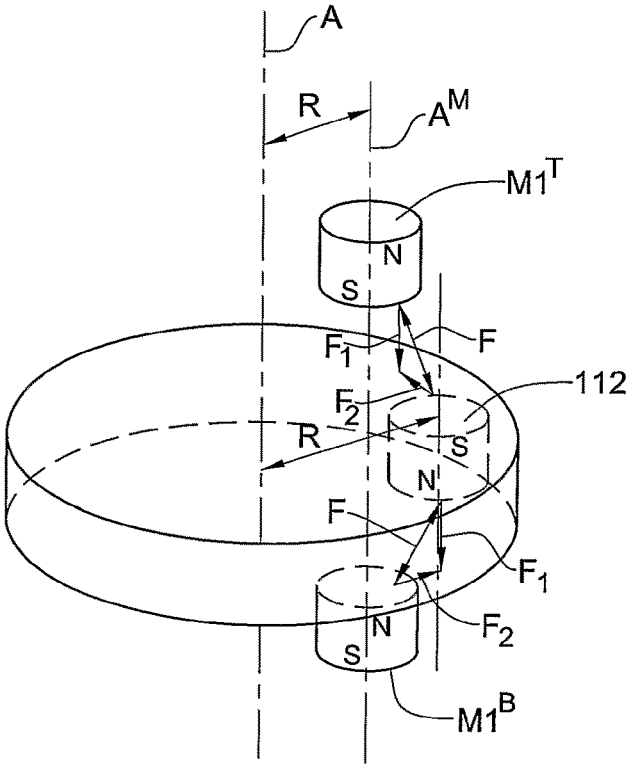
FIG. 4A is a schematic top isometric view illustrating the magnets setup, and the forces acting therebetween.
Figure 4B:
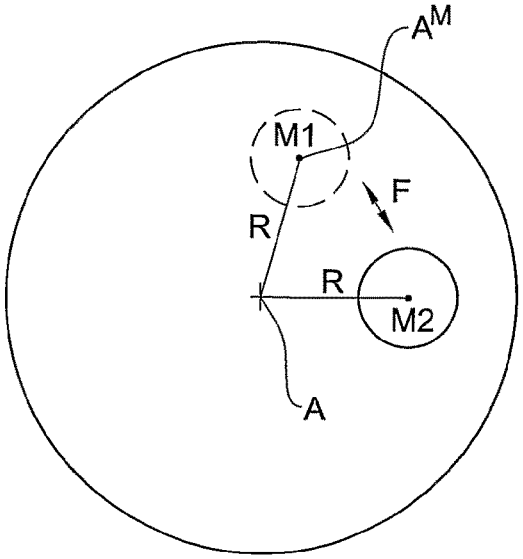
FIG. 4B is a top view of FIG. 4A.

The second magnet carrier plate 120 accommodates a second magnet M2 disposed such that its poles face corresponding poles of the first magnets $M1^T$ and $M1^B$, respectively, giving rise to repulsion magnetic force F residing therebetween (FIGS. 4A and 4B). The arrangement as disclosed in the drawings is such that the second magnet M2 is offset at the same distance R from the axis A as the first magnets $M1^T$ and $M1^B$ (FIG. 3).

However, it is denoted that the magnets $M1^T$ and $M1^B$ and M2 are not necessarily of identical magnitude nor do magnets $M1^T$ and $M1^B$ and the second magnets M2 have to be disposed on equal radii.

The *sealed* space [114] of the rotary dampening mechanism 78 (FIGS. 2 and 3) is filled with a viscous substance [86], e.g. silicon gel, whereby the second magnet carrier plate 120 is prevented from freely rotating within the sealed chamber 80 as would be the case at the absence of the viscous substance [86]. It is thus appreciated that sheer forces extending between the second magnet [support member 82] *carrier plate 120* and the viscous substance [86] (and respectively between the smeared viscous substance [86] and the inside walls of the sealed chamber 80), results in slowing down of the rotation of the second magnet carrier plate 120 with respect to the housing 12. It is appreciated that shear forces developing within the dampening mechanism and acting to slow the second magnet support member develop between the viscous substance and any two surfaces moving in opposite directions.

As can best be seen in FIG. [8A] *4A*, the repulsion force F acting between the first magnets $M1^T$ and $M1^B$ and the second magnet M2 has force components, namely force vector F1 axially extending (parallel to axis A) acting to axially repulse the second magnet support chamber 80 and symmetrically maintain it between the first magnets $M1^T$ and $M1^B$, and force vector F2 giving rise to generating rotary force in a direction opposite to a force applied on the irrigation head 30 by a liquid jet immersing from the outlet 22 of the jet forming nozzle 18, to thereby dampen said rotary motion.

It is further appreciated that rotational speed of the second magnet carrier plate 120 within the sealed chamber 80 may be governing by providing the second magnet carrier plate 120 with lateral and/or radial protrusions, thereby increasing the surface area thereof.

In operation, irrigation liquid enters through inlet port 14 and exits through jet aperture 22 as a strong jet impinging against surface 48 of the irrigation head 30, resulting in generating a rotary reactionary force, causing irrigation head 30 to rotate about the rotary axis A. As rotation of the irrigation head 30 commences with the associated second magnet carrier plate 120 and the articulated second magnet M2 within the sealed chamber 80, magnet repulsion forces F (FIG. [8A] *4A*) result in generating a reactionary rotary force between the first magnets $M1^T$ and $M1^B$ and the second magnet M2. However, owing to the presence of a viscous substance [86] within the sealed chamber 80, rotation of the second magnet carrier plate 120 is dampened, which in turn yields corresponding slowing of the rotary motion of the associated irrigation head 30.

Figure 6:
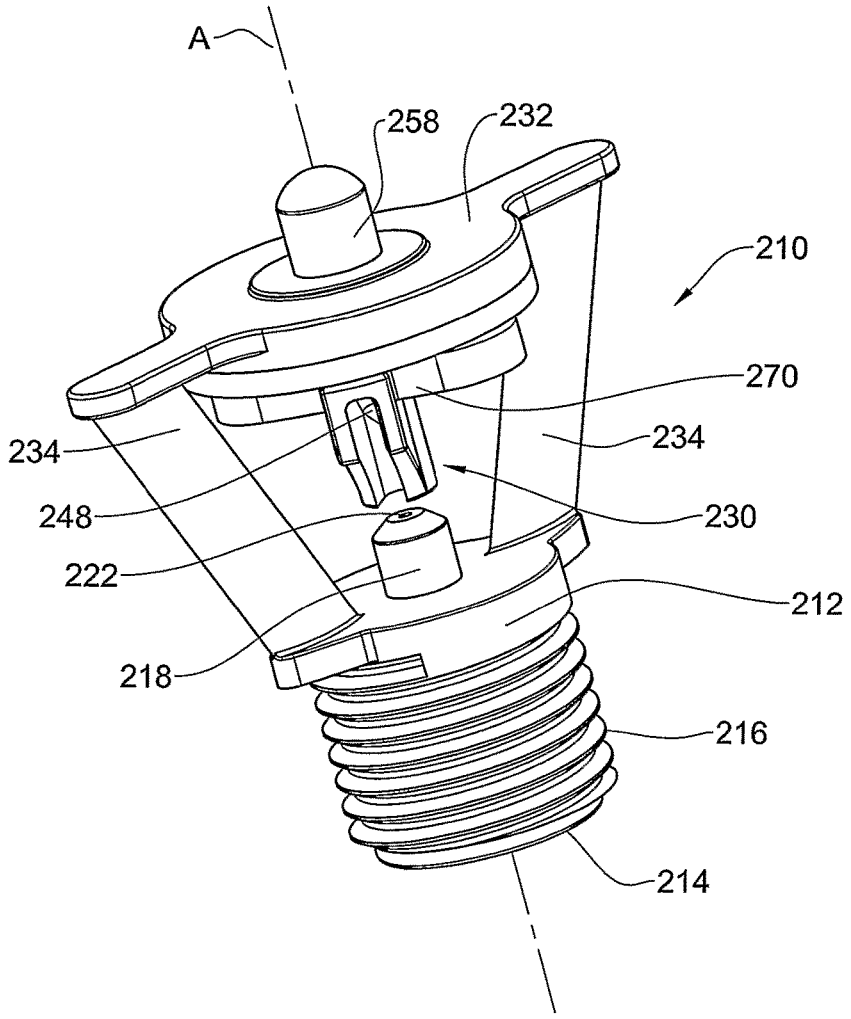
Figure 7A:
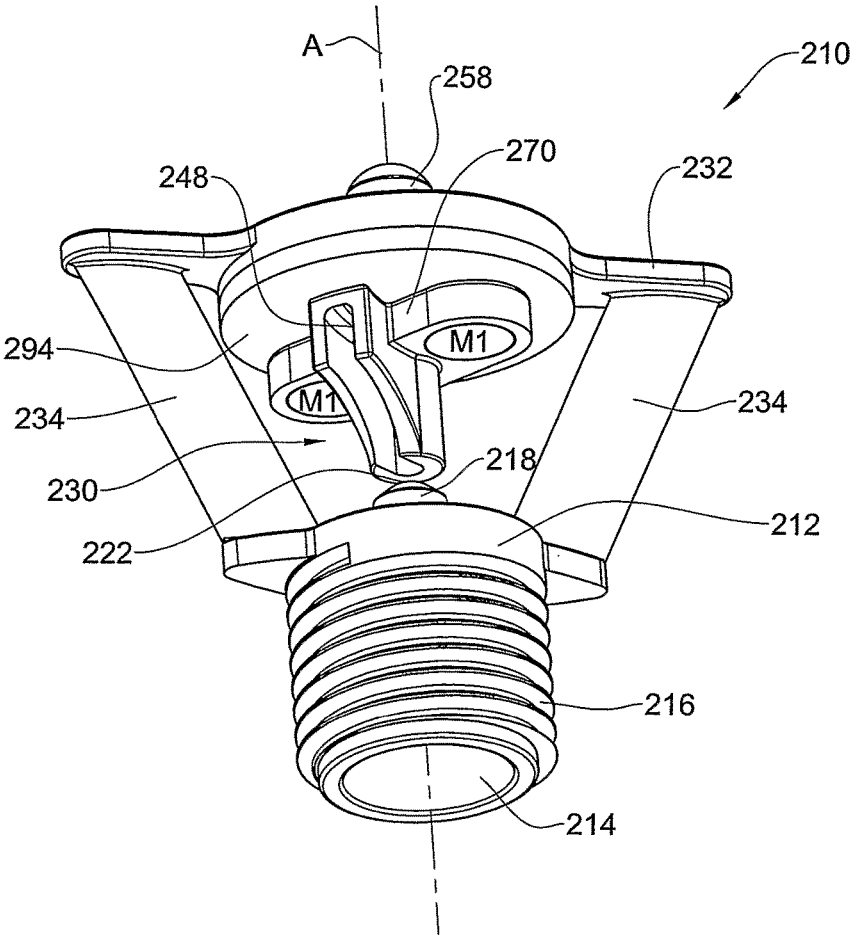
FIG. 7A is a bottom isometric view of the sprinkler seen in FIG. 5.

It is appreciated that the position illustrated in FIGS. 6 and 7 is a temporary intermediate operative position which can not occur while the sprinkler is at rest, i.e. the second magnet M2 will normally not extend axially aligned with the first magnets $M1^T$ and $M1^B$. Rather, the second magnet M2 is angularly spaced from the axial location of the first magnets $M1^T$ and $M1^B$, however extends axially between the pair of first magnets retaining a magnetic force equilibrium.

One or more through-going apertures 123 are formed in the second magnet carrier plate 120, whereby the viscous substance [86] is free to flow between surface of the second magnet carrier plate 120 at either an up-right or a bottoms-up position of the sprinkler.

A second aspect of the invention is now illustrated with reference to FIGS. 5 to 39.

Figure 5:
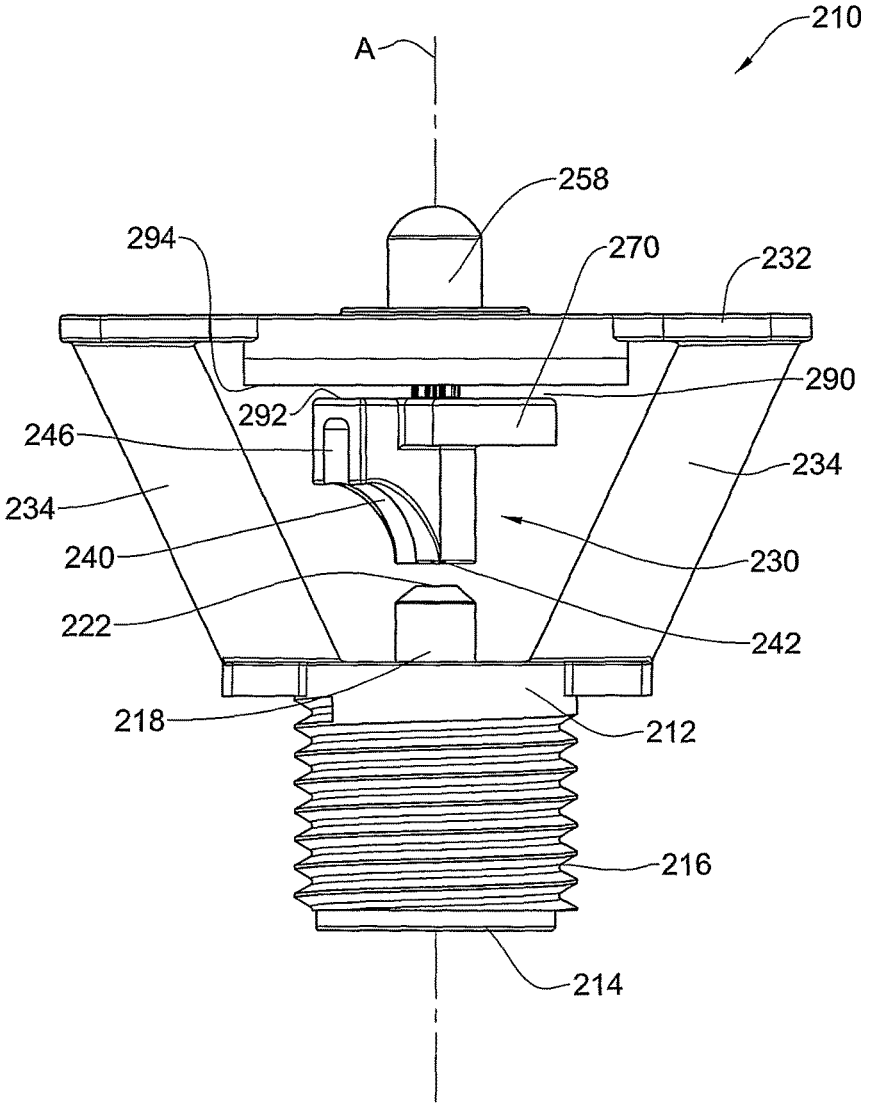

Attention is first directed to FIGS. 5 to 7 of the drawings illustrating a rotary sprinkler generally designated 210 in accordance with a first embodiment of the invention. The sprinkler comprises a housing 212 which in turn is formed with an inlet port 214 for coupling to a pressurized source of water (not shown) e.g. an irrigation supply line, for example by screw coupling to external threading 216.

A jet forming nozzle 218 extends from the inlet port 214 having an inlet side 220 (not shown) being in flow communication with inlet port 214 and a jet outlet 222 facing a rotary irrigation head generally designated 230.

Integrally formed with the housing 212 there is a bridge member 232 extending over two support arms 234 disposed in a V-like configuration. The support arms 234 have a blade-like cross section so as to cause minimal interference with a jet emitted from the rotary sprinkler head.

The irrigation head 230 is a swivel-type irrigator formed with a reaction generating deflection groove 240 having an inlet end 242 (FIG. 5) extending substantially vertically above the jet outlet 222 of the jet forming nozzle 218, and an outlet opening 246 extending substantially radially, with a reaction generating surface 248 (best seen in FIGS. 6, 7A and 7B) designed for imparting the rotary head 230 with rotary motion upon impinging of a water jet emitted from the jet forming nozzle 218 thereupon.

Figure 7B:
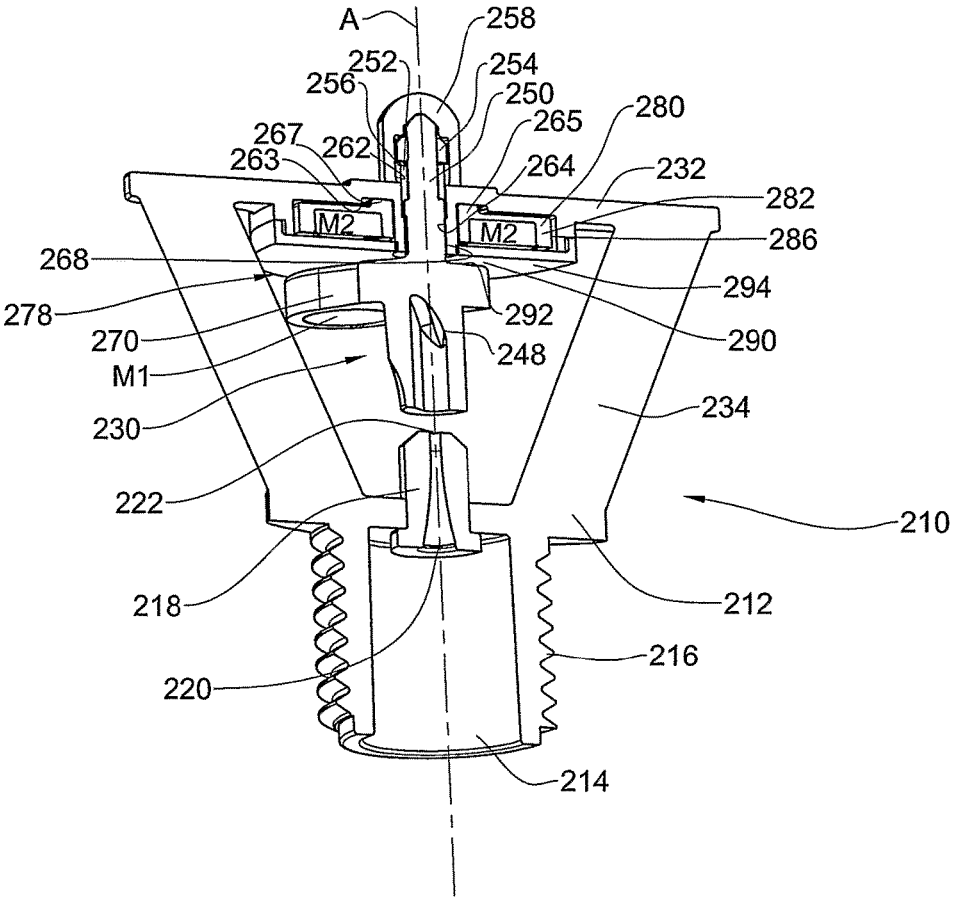
FIG. 7B is a longitudinally sectioned bottom isometric view of the sprinkler seen in FIG. 5.

As seen in FIG. 7B, the irrigation head 230 is fitted with an upwardly extending boss 250 extending into an aperture 252 formed in the bridge 232 and axially retained in place by means of a retention ring 254 however free to rotate about longitudinal axis (rotary axis A). It is noticed that the retention ring 254 rests over an axial projection 256 extending from the bridge member 232. The retention arrangement is concealed by a cap 258 which is snap fitted to the bridge member 232 at 262 or maybe screw coupled or adhered thereto.

As can further be noticed in FIG. 7B, the irrigation head 230 is formed with a widened section 264 serving as a bushing opposite surface 268 of the housing, preventing bobbing of the irrigation head 230.

Figure 8A:
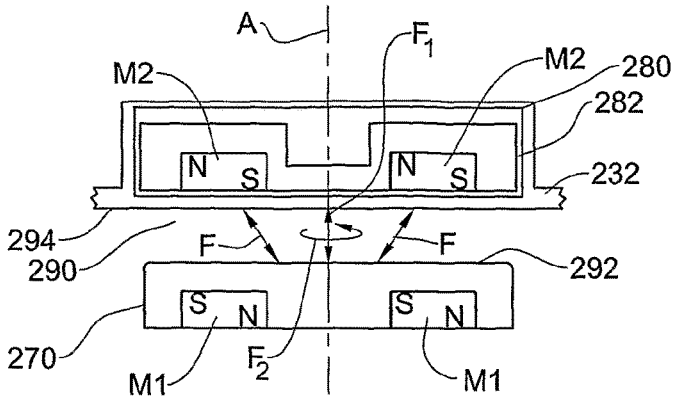
FIG. 8A is a schematic side view illustrating the magnets setup, and the forces acting therebetween.

Formed with the irrigation head 230 is a magnet housing 270 comprising two disk-like magnets designated M1. The magnets M1 are fixedly positioned within the magnet housing 270 and are arranged such that like poles thereof extend in the same direction. In the present example, the north pole of the two magnets M1 face downwards, as illustrated in FIG. 8A (it should be appreciated that the relative position of the magnet housing 270 and the second magnet support member 282 as illustrated in FIG. 8A is theoretical situation is illustrated for sake of clarity only (in practice, under no-flow conditions, an equilibrium of force exists, and the first magnets M1 and the second magnets M2 are rotated at 90° with respect to one another, as can best be appreciated from FIGS. 8B and 8C). This comment applies as well to the position depicted in FIGS. 11B, 14, 16, 17 and 20, depicted for sake of explanation and clarity only. Furthermore, the two magnets M1 are equally radially offset from the rotation axis A and said magnets M1 are substantially the same magnitude.

However, it is denoted that the magnets M1 and M2 are not necessarily of identical magnitude nor do the sets of first magnets M1 and the set of second magnets M2 have to be disposed on equal radii. However, it is desirable that the magnets of each of the set of first magnets M1 and the set of second magnets M2 be substantially of same magnitude and disposed substantially on the same radii from the center (axis of rotation A), to thereby eliminate or at least substantially reduce any bending moments and other parasitic forces which may otherwise reside in the system.

A rotary dampening mechanism generally designated 278 (FIG. 7B) is formed in the housing 232. A sealed chamber 280 rotatably accommodates a second magnet support member 282 which in turn is fitted with a pair of second magnets M2 fixed thereto wherein the second magnets M2 are disposed such that their like poles face towards like poles of the first magnets M1, as can be seen in FIG. 8A, thus giving rise to repulsion force acting therebetween. The second magnets M1 are also disposed symmetrically about the rotary axis A and are of substantially like magnitude.

Figure 8B:
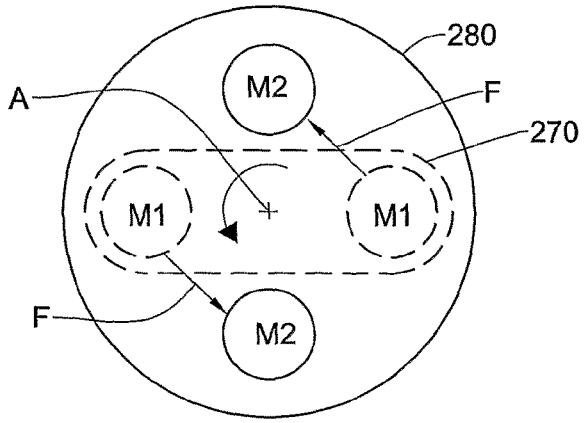
FIG. 8B is a schematic top view illustrating the magnets setup, and the forces acting therebetween.
Figure 8C:
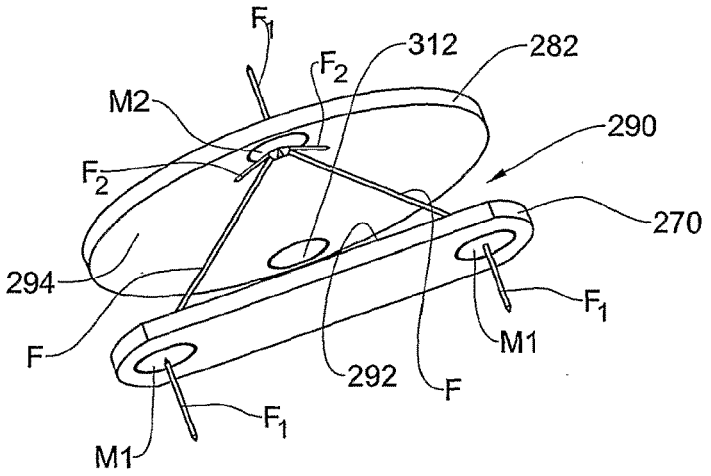
FIG. 8C is a schematic bottom isometric view illustrating the magnets setup, and the forces acting therebetween.
Figure 9:
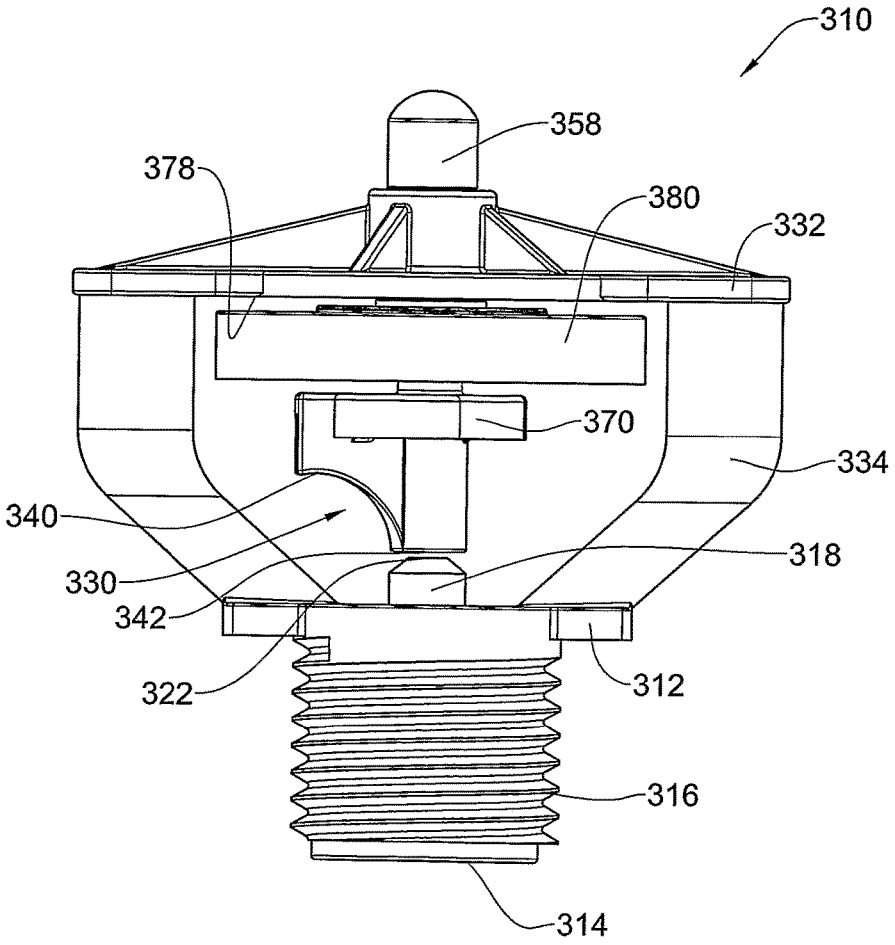
Figure 10:
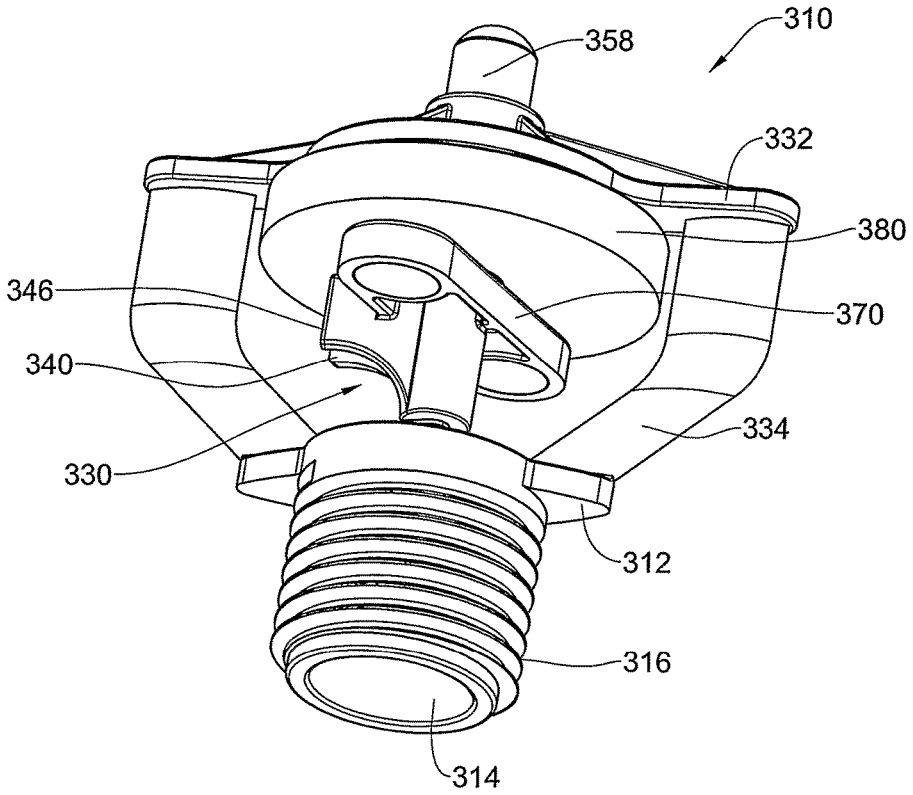

As can best be seen in FIG. 8C, the repulsion force F acting between the first magnets M1 and the second magnets M2 has force components, namely force vector F1 axially extending (parallel to axis A) acting to eliminate or substantially reduce friction between components of the system (namely, friction of the top end of the boss 250 against the cap 258, said forces being translated to the lubricated area within the sealed chamber), and force vector F2 giving rise to generating rotary motion between the magnet arrays, coaxial with a rotary axis A of the sprinkler and acts to bias the irrigation head 230 in a direction opposite to an axial force applied on the irrigation head 230 by a liquid jet immersing from the outlet 222 of the jet forming nozzle 218.

As can still be noted in FIG. 7B the sealed chamber 280 is formed with an annular friction surface 263 and the second magnet support member 282 is formed with a corresponding annular projection 265 formed with a top surface 267 bearing against the annular friction surface 263, said surfaces 263 and 267 being substantially smooth thereby reducing friction therebetween. However it is appreciated that the sealed chamber 280 is filled with a viscous substance such as silicone oil or silicone gel which serves as a lubricant.

The sealed chamber 280 is filled with a viscous substance 286, e.g. silicon gel, whereby the second magnet support member 282 is prevented from freely rotating within the sealed chamber 280 as would be the case at the absence of the viscous substance 286. It is thus appreciated that sheer forces extending between the second magnet support member 282 and the viscous substance 286 cause the slowing down of the rotation of the second magnet support member with respect to the housing 212. It is appreciated that sheer forces developing within the dampening mechanism and acting to slow the second magnet support member develop between the viscous substance and any two surfaces moving in opposite directions.

It is further appreciated that governing the speed of rotation of the second magnet support member 282 within the sealed chamber 280 may be by providing the second magnet support member 282 with lateral and/or radial protrusions, thereby increasing the surface area thereof.

In operation, liquid enters through inlet port 214 and exits through jet aperture 222 as a strong jet impinging against surface 248 of the irrigation head 230, resulting in generating a rotary reactionary force, causing irrigation head 230 to rotate about the rotary axis A. As rotation of the irrigation head 230 commences, magnet repulsion forces F (FIG. [4A] *8A*) will result in generating a reactionary rotary force of the second magnets M2 resulting in rotation of the second magnet support member 282 within the sealed chamber 280. However, owing to the presence of a viscous substance 286 within the sealed chamber 280, rotation of the second magnets M2 is dampened which in turn yields corresponding dampening of the rotary motion of the first magnets M1 and the associated irrigation head 230.

Noting the repulsion forces residing between the first magnet M1 and the second magnets M2 at the steady state of the system, namely at rest (at the absence of a liquid jet), the magnet housing 270 and the second magnet support member 282 tends to reach an equilibrium position as in the position illustrated in FIG. 8B. However, as mentioned above, rotation of the magnet housing 270 under influence of the water reactionary forces, tends to rotate the second magnet support member 282 however significantly slower owing to the dampening mechanism as disclosed above.

It is noted that the repulsion magnetic force F extending between the two arrays of magnets M1 and M2 urges the rotary irrigation head 230 in a downwards direction and the space designated 290 between the upper face 292 of the magnet housing 270 and the bottom surface 294 of the bridge 232 remains in tact thus assuring a fixed gap therebetween whereby any dirt such as sand grains, etc. do not interfere with proper rotary motion of the irrigation head 230. As will be disclosed hereinafter in connection with other embodiments of the invention (e.g. in connection with the pop-up embodiment of FIGS. 12 to 17), the space may vary between an open position (i.e. elevated position of the irrigation head) and a closed position thereof, however the space remains constant at the respective positions.

Disposing each of the first magnets M1 and the second magnets M2 with like poles facing each other (and such that they are disposed at identical distances from the axis of rotation A, i.e. at the same radii) results in forced motion of the second magnet support member imparted thereto by rotary motion of the magnet housing 270. However, provision of only one first magnet M1 and one second magnet M2 may result in generation of undesirable bending moments and friction forces. On the other hand, providing more than a pair of first magnets M1 and respectively a pair of second magnets M2, may effect the magnitude of the rotary moment (imparted by force vector F2) developing between the magnet housing 270 and the second magnet support member 282 which effectively results in an increased repulsion force F however lower rotary resistance.

Turning now to FIGS. 9 to 11B there is illustrated embodiment of the sprinkler in accordance with the present invention wherein like elements have been designated like numbers as in connection with the previous embodiment depicted in connection with FIGS. 5 to 8, however shifted by 300.

The sprinkler generally designated 310 comprises a housing 312 formed with an inlet port 314 and an external threaded portion 316 for screw coupling to a liquid supply line (not shown). A jet-forming nozzle 318 extends from the inlet port 314 and has an inlet side 320 (not shown) and a jet outlet 322 axially extending opposite a rotary irrigation head generally designated 330. A bridge member 332 is integrally formed with the housing 312 extending over two support arms 334 generally in a V-like configuration. The irrigation head 330 is substantially similar to the irrigation head disclosed in connection with the previous embodiment of FIGS. 5 to 8 and comprises like elements namely a reaction generating deflection groove 340 having an inlet 342 extending axially aligned with the jet outlet 322, and an outlet 346 (FIG. 10) extending substantially radially, with a reaction generating surface 348 (not shown) designed for imparting the rotary head 330 with rotary motion upon impinging of a water jet there against.

The irrigation head 330 is fitted with a long boss 350 extending through an aperture 352 formed in the bridge member 332 and retained in place by retention ring 354 allowing for substantially free rotation of irrigation head 330 about longitudinal axis A (rotational axis). Like in the previous embodiment, it is noticed that the retention ring 354 rests over an axial projection 356 extending from a boss 381 extending from the sealed chamber 380. The retention arrangement is covered by cap 358 snap-fitted to the bridge member 332 at 362.

Unlike the previous embodiment, the rotary dampening mechanism [178] *378* is not integrated with the bridge member [132] *332* but is rather articulated thereto. The dampening mechanism [178] *378* comprises a sealed chamber [180] *380* rotatably accommodating a second magnet support member [182] *382* which in turn arrests a pair of second magnets M2.

Figure 11A:
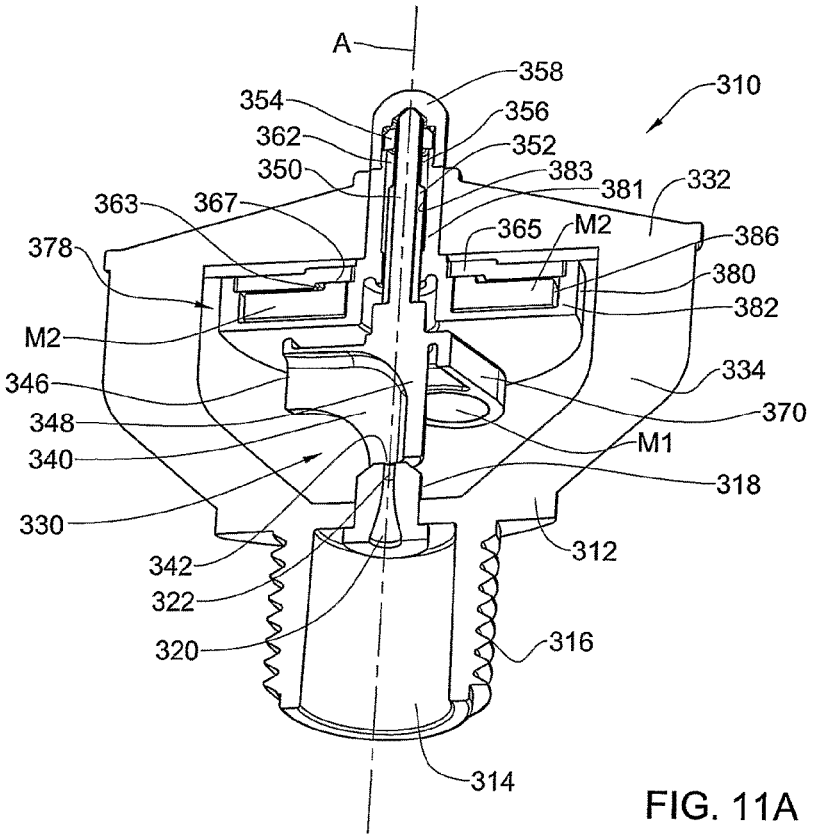
FIG. 11A is a longitudinally sectioned bottom isometric view of the sprinkler seen in FIG. 9.
Figure 11B:
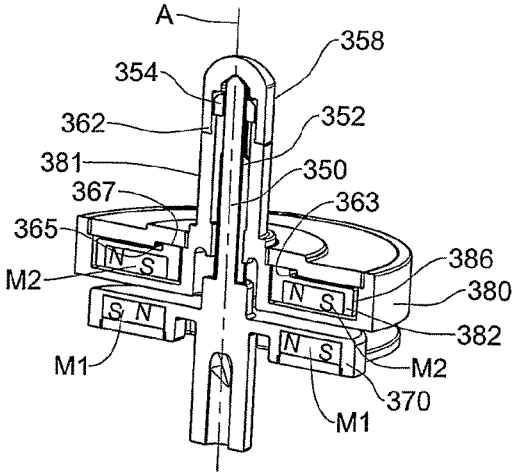
FIG. 11B is an isometric sectioned view of the dampening mechanism of the sprinkler seen in FIG. 9.
Figure 12:
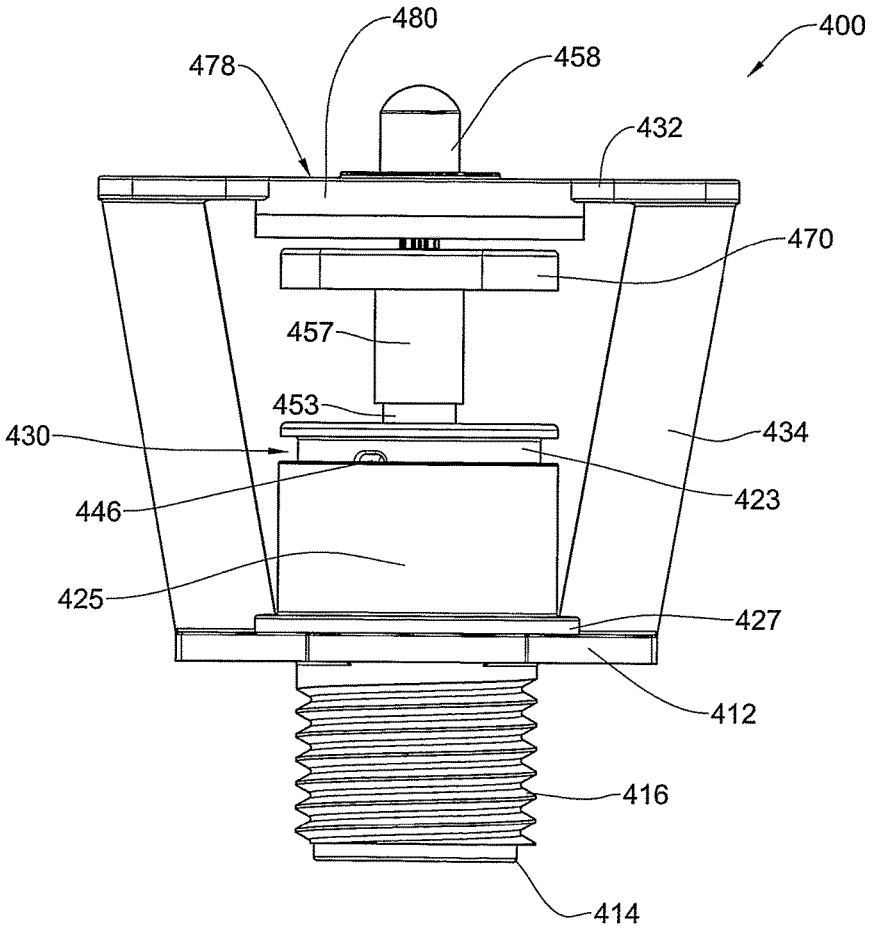
Figure 13:
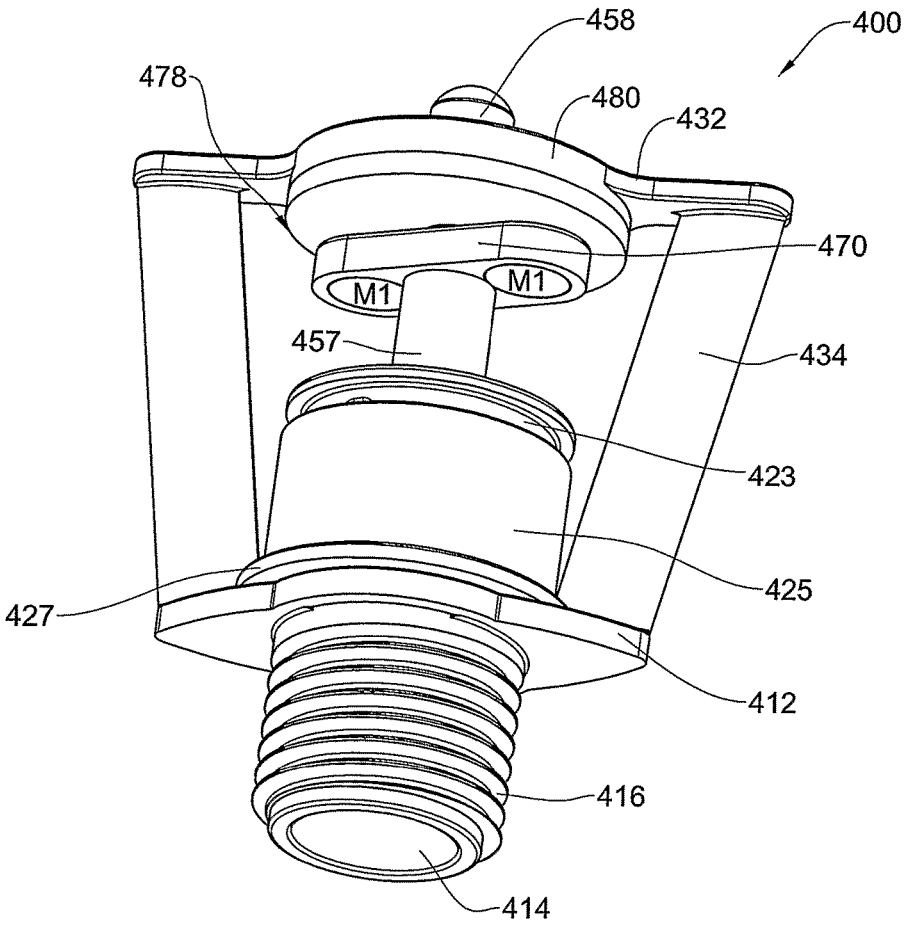
Figure 14:
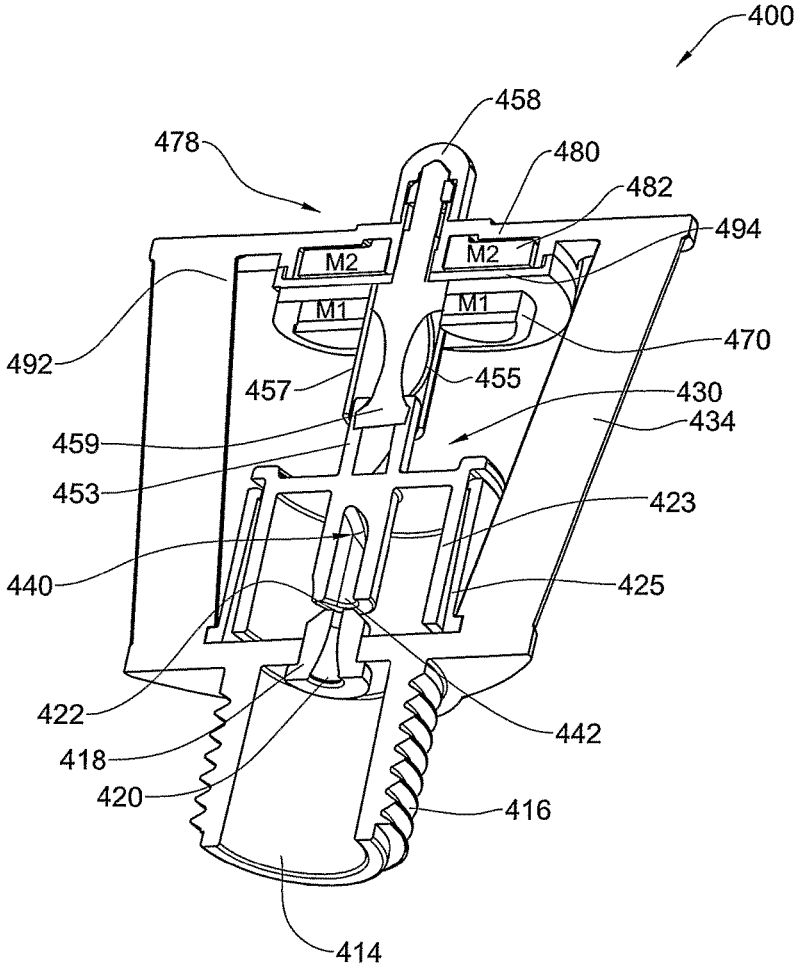
Figure 15:
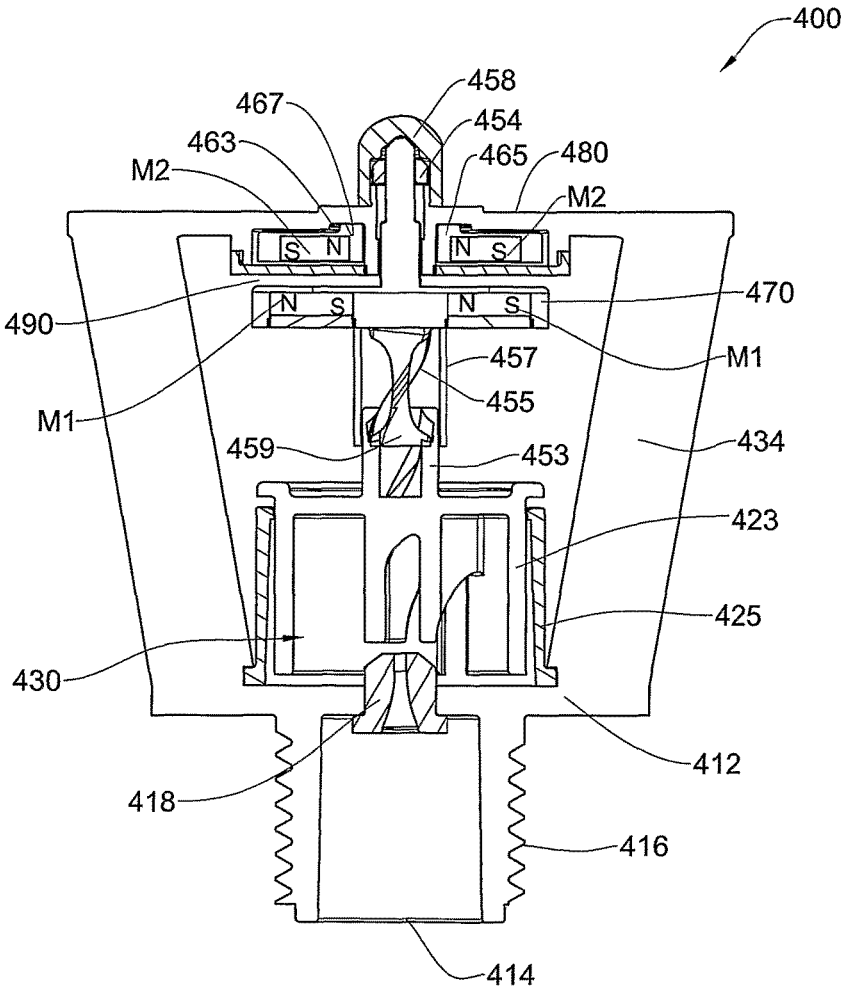
Figure 16:
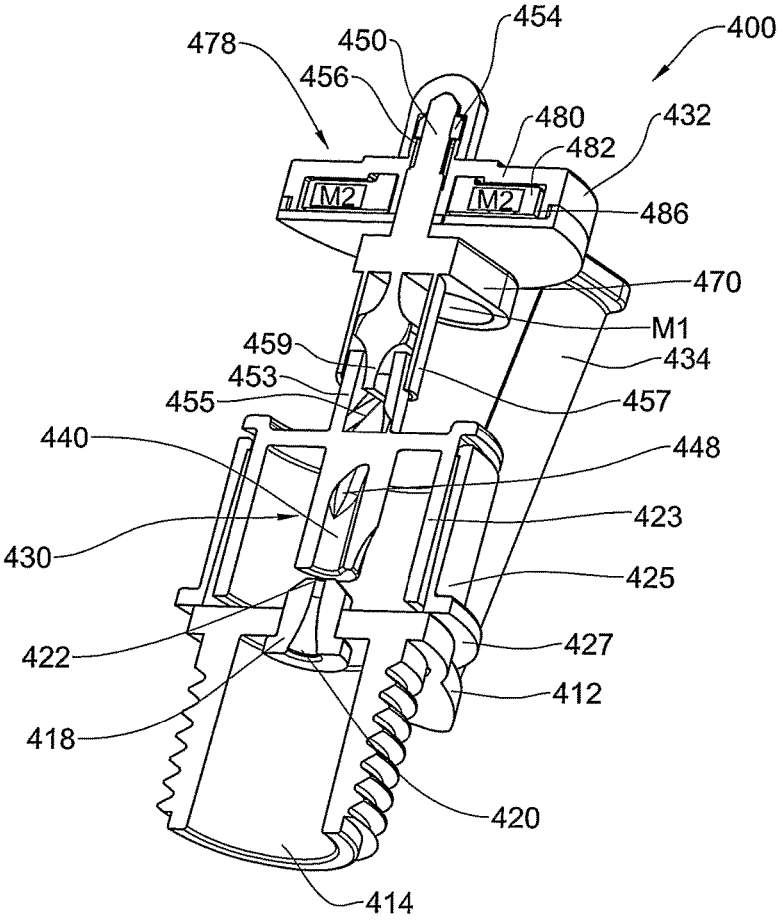

Like in the previous embodiment, the second magnets M2 are disposed such that their like poles face towards their like poles of the first magnets M1 and further, the first magnets M1 and the second magnets M2 are substantially uniformly distributed and are of substantially equal magnetic magnitude (FIGS. 11A and 11B). However, as indicated hereinabove, the magnets M1 and M2 are not necessarily of identical magnitude nor do the sets of first magnets M1 and the set of second magnets M2 have to be disposed on equal radii. However, it is desirable that the magnets of each of the set of first magnets M1 and the set of second magnets M2 be substantially of same magnitude and disposed substantially on the same radii from the center (axis of rotation A), to thereby eliminate or at least substantially reduce any bending moments and other parasitic forces which may otherwise reside in the system.

A viscous substance 386 fills the sealed chamber 380 so as to apply a braking force on the second magnet support member 382, owing to sheer forces therebetween.

The sealed chamber 380 is rotationally and axially secured to the bridge member 332 by a boss portion 381 coaxially receiving the boss 350 of the irrigation head 330 and securely fitted within an aperture 383 formed in the bridge member 332.

The principles of operation of the sprinkler 310 in accordance with the second embodiment are similar to those explained in connection with the previous embodiment.

Yet another embodiment of the invention is disclosed with further reference to FIGS. 12 through 17 of the drawings where like elements have been designated with like reference numbers as in connection with the first embodiment hereinabove, however, shifted by 400.

The sprinkler in accordance with this embodiment, generally designated 400, comprises a housing 412 formed with an inlet port 414 connectable to a liquid irrigation supply (not shown) by means of a threaded coupling 416 (as is apparent that other couplings are possible too, e.g. snap-fitting, press-fitting, etc.). A jet-forming nozzle 418 (FIG. 14) is secured within the housing extending from the inlet port 414 and has an inlet port 420 for liquid ingress and a jet outlet 422 through which a liquid jet is upwardly directed towards a rotary irrigation head generally designated 430. A bridge member 432 is integrally formed with the housing 412 extending over two support arms 434.

The rotary irrigation head 430 comprises a reactionary deflection groove 440 having an inlet 442 extending axially opposite the jet outlet 422, and a jet outlet 446 (FIGS. 12 and 17) extending substantially radially, with a reaction-generating surface 448 (FIG. 16) designed for imparting the rotary head 430 with rotary motion as well as with an axial displacement upwardly, upon impinging of a water jet there against.

However, unlike the previous embodiments, the sprinkler 400 in accordance with the present embodiment is a pop-up type, namely comprises an arrangement for concealing the rotary irrigation head 430 and the jet forming nozzle 418. For that purpose, the rotary irrigation head is formed with a downwardly extending skirt 423 telescopically received within an upwardly extending skirt 425 snappingly fitted at 427 to the base of housing 412. Upwardly extending from the rotary irrigation head 430 there is a hollow boss 453 internally formed with a helical path (i.e., a threaded profile) designated at 455. The boss 453 is coaxially displaceable within a downwardly extending sleeve 457 extending from a magnet support 470 fixedly fitted with a pair of first magnets M1 and further comprising within the downwardly extending sleeve 457 a helical rider 459 (FIGS. 14 to 16) bearing against the helical path 455. Upwardly extending from the magnet support 470 there is a boss 450 supported within the bridge member 432 as in the previous embodiments, namely by means of a retention ring 454 bearing against radial protruding shoulders 456 extending from the bridge 432, whereby the magnet support 470 is freely rotatable with respect to the bridge member 432 (and respectively with respect to the housing 412) however being axially retained.

A rotary dampening mechanism generally designated 478 comprises a sealed chamber 480 rotatably accommodating a second magnet support member 482 accommodating a pair of second magnets M2 fixed thereto as disclosed in connection with the previous embodiments. The sealed chamber 480 is filled with a viscous substance 486 (FIG. 16) whereby the second magnet support member 482 (FIG. 14) is prevented from freely rotating within the sealed chamber 480 as will be the case at the absence of the viscous substance 486.

Figure 17:
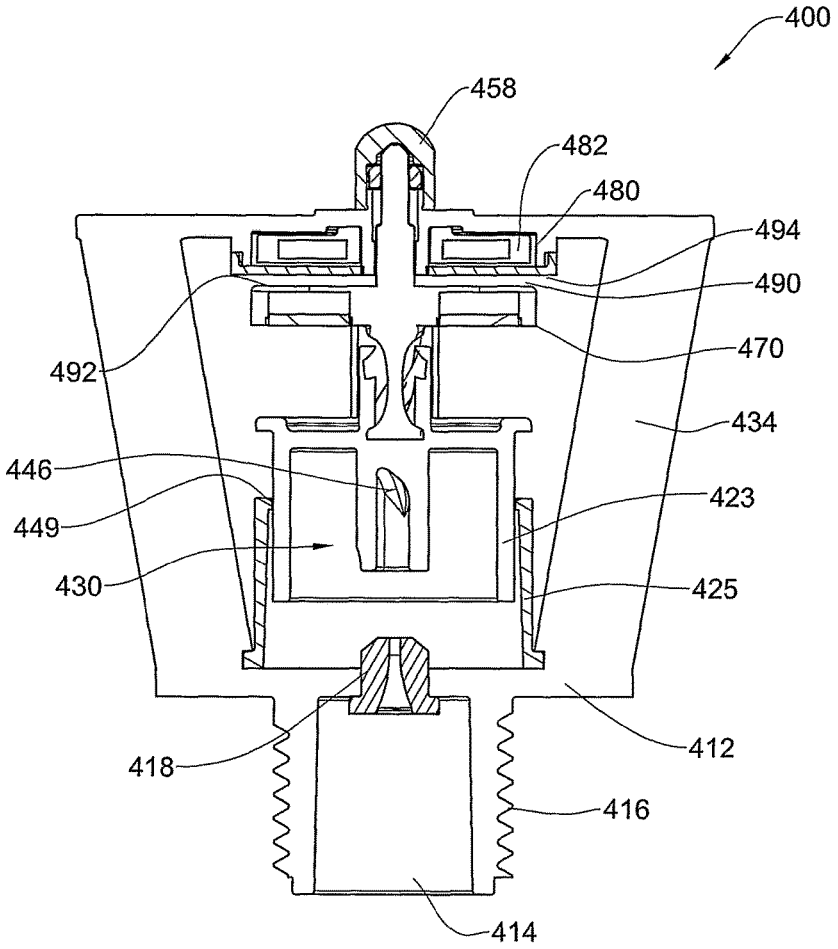
Figure 18:
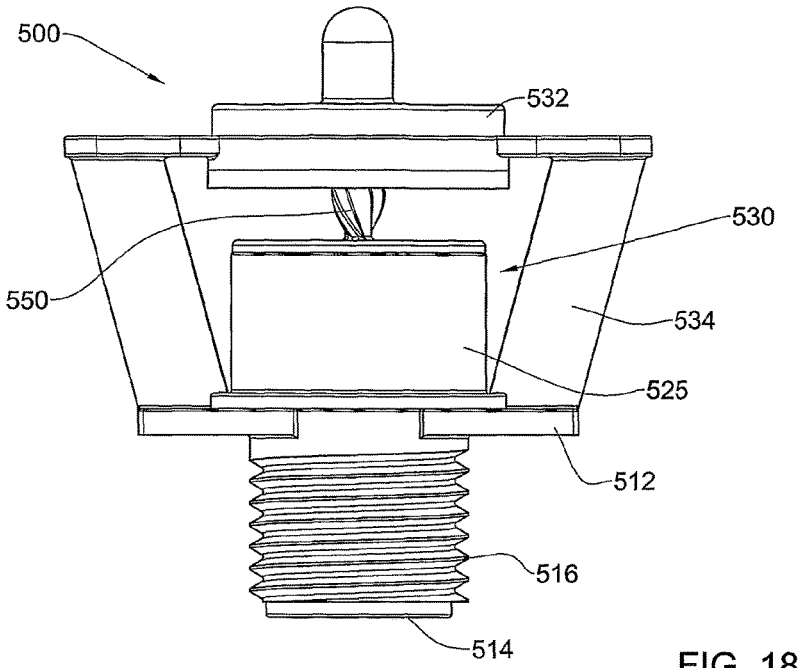
Figure 19:
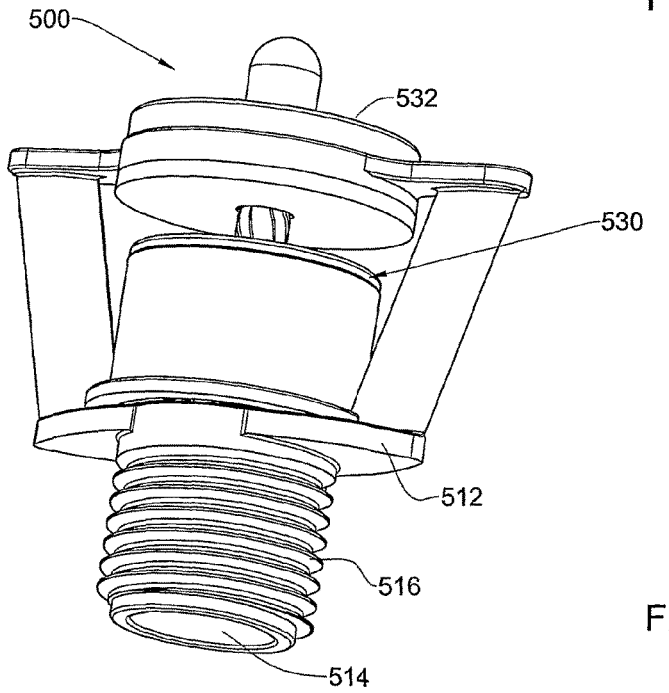
Figure 20:
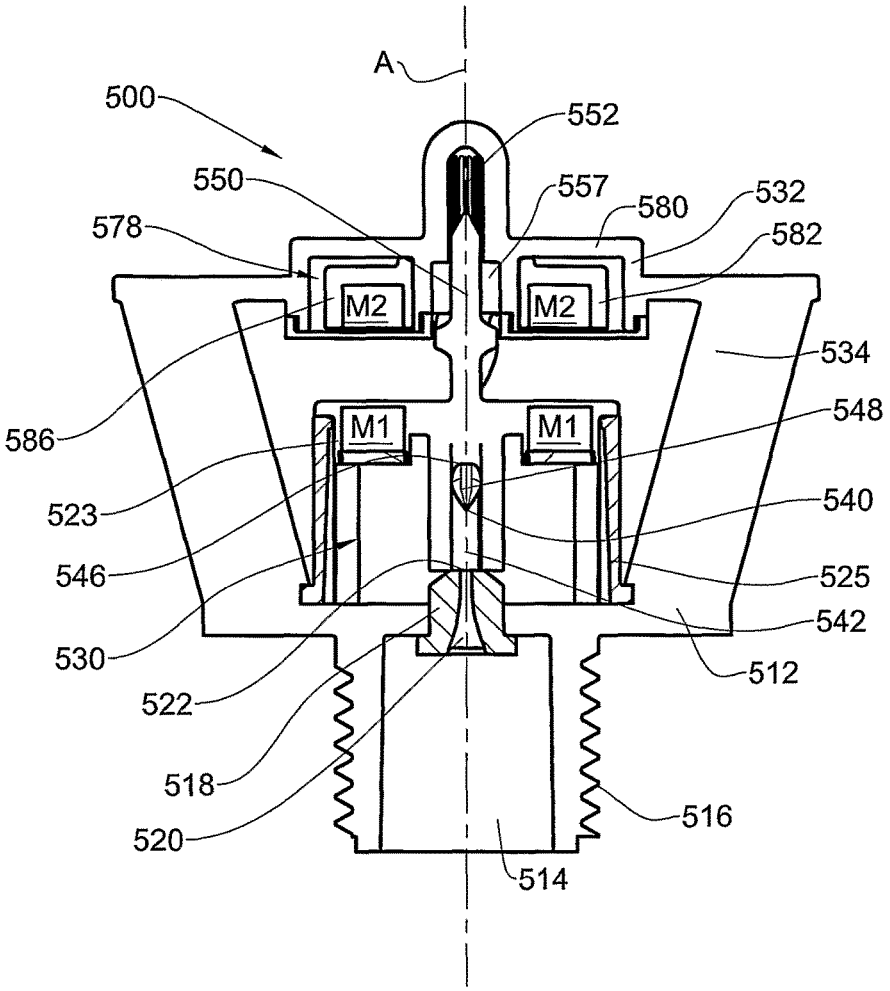
Figure 21:
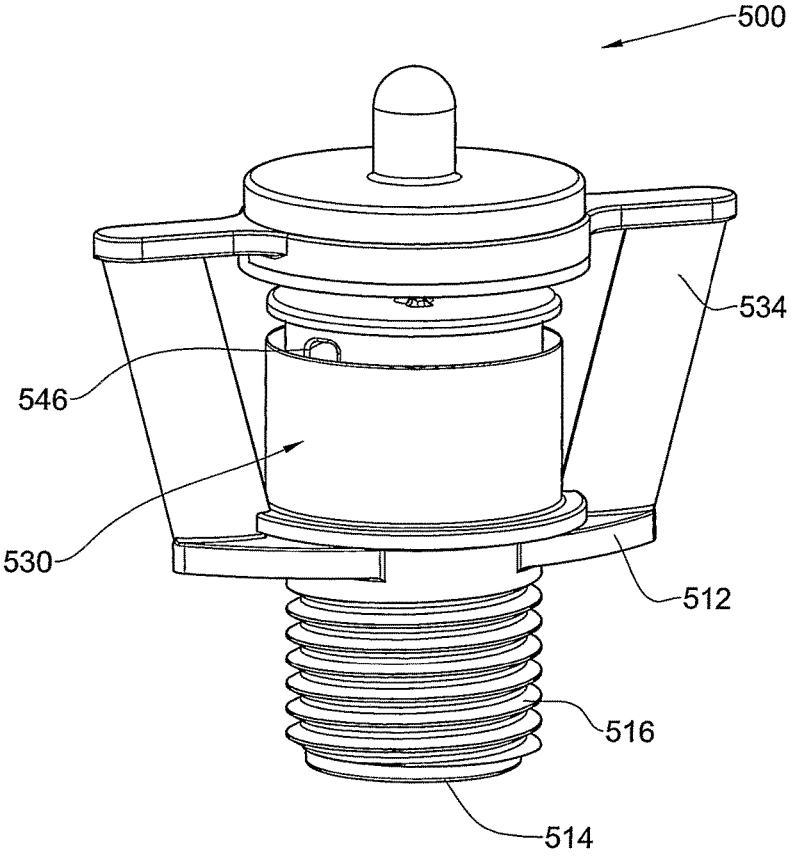
Figure 22:
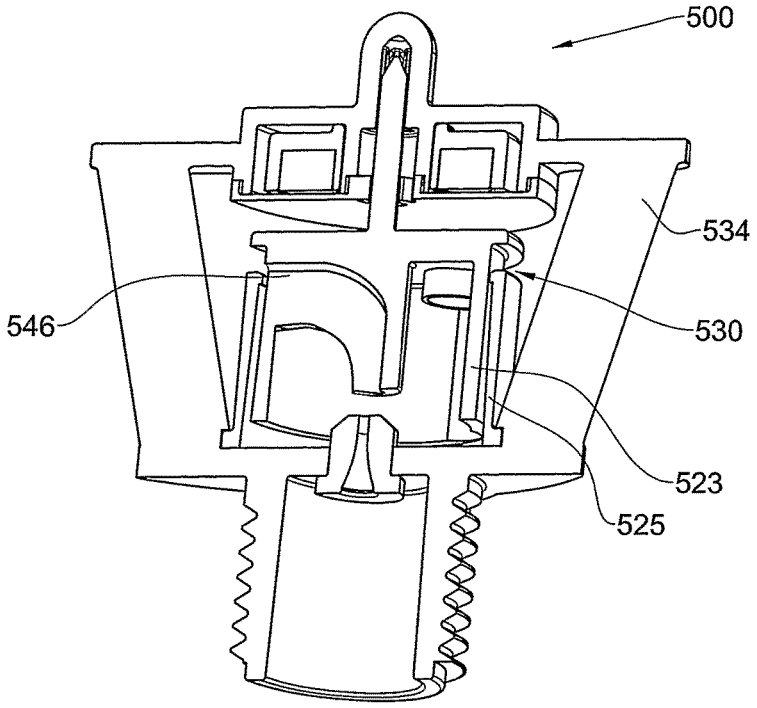
Figure 23:
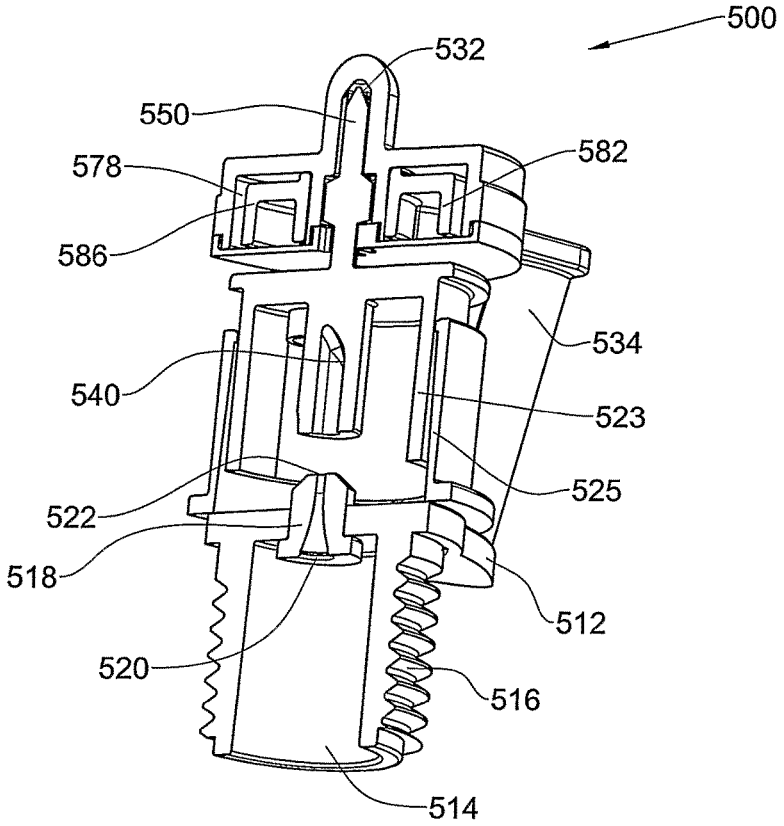
Figure 24:
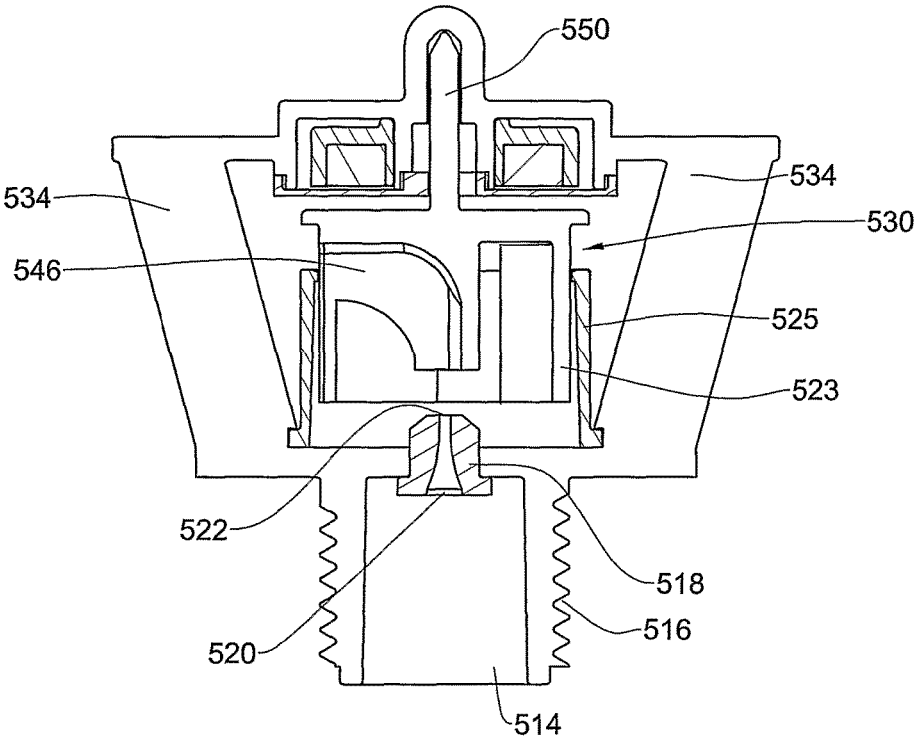
Figure 25:
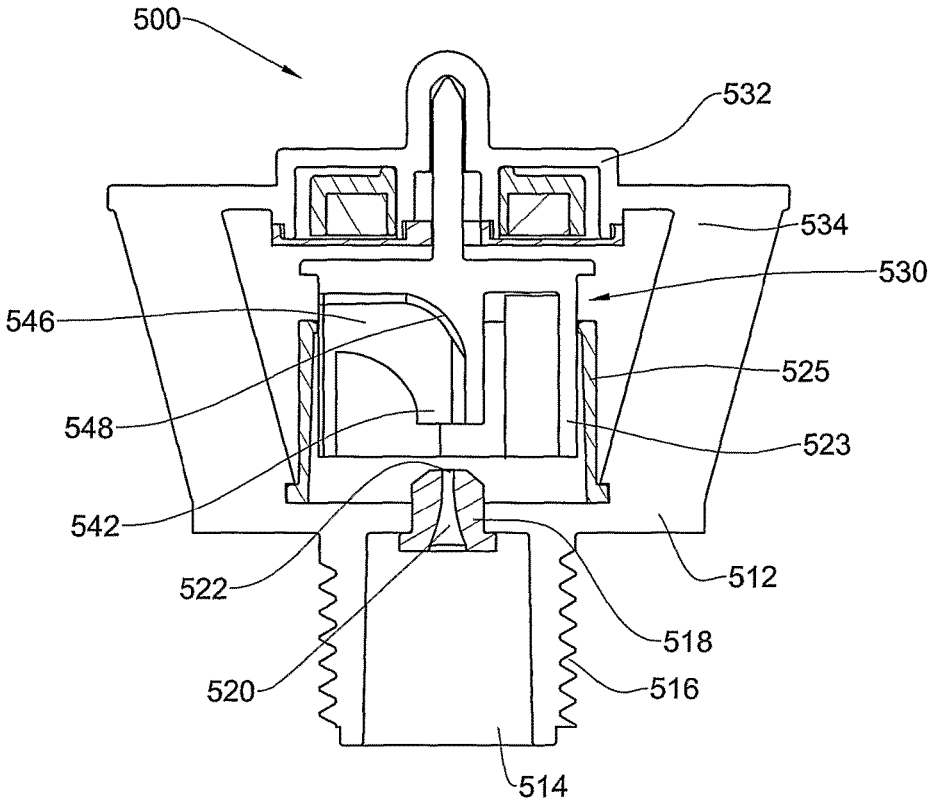

The arrangement in accordance with the sprinkler 400 is such that a liquid jet emitted through jet outlets 422 at a first instance causes the irrigation head 430 to rise (at least to a position where outlet 446 extending above the external skirt 425), whilst simultaneously causing it to rotate owing to reactionary forces developed by the liquid impinging against the deflection surface 448 (FIG. 17). Rising of the irrigation head 430 entails rotary displacement of the magnet support 470 owing to the rider 459 bearing against the helical path 455 whereby rotary coupling takes place between the irrigation head 430 and the magnet support 470. It is appreciated that rising of the rotary irrigation head is to an extent sufficient to expose the jet outlet 446 beyond an upper edge 449 of the skirt 425, so as not to interfere with a water jet emitted therefrom.

The dampening mechanism acts in the same manner as disclosed hereinabove in connection with the previous embodiments.

Upon termination of the water jet immersing through the outlet 422, the rotary irrigation head 430 descends, under force of gravity) to its lower position as in FIGS. 12 to 17, thus concealing the irrigation outlets 446 as well as the jet outlet 422, thus preventing access to dirt and insects which might have otherwise clogged the outlets and interfere with proper operation of the sprinkler.

Like in the previous embodiments, it is noticed that just like in the previous embodiments disclosed hereinbefore, the repulsion force acting between the first magnets M1 and the second magnets M2 acts coaxial with the rotary axis A of the sprinkler and acts to bias irrigation head 430 downwards, against the force imparted by the emitted liquid jet tending to raise the irrigation head into its operative position. However clearance 490 between a top surface 492 of the magnet support 470 and a bottom surface 494 of the sealed chamber 480, remains fixed owing to geometrical relation of the components of the sprinkler.

Turning now to FIGS. 18 to 25 there is illustrated yet another embodiment of the present invention wherein like elements have been designated with like reference numbers as in connection with the first embodiment hereinabove, however shifted by [400] *500*.

The sprinkler, generally designated 500 comprises a housing 512 formed with a liquid inlet port 514 connectable to a liquid irrigation supply line (not shown) e.g., by means of threaded coupling 516. A jet forming nozzle 518 (FIG. 20) is secured within the housing, extending from the inlet port 514 and formed with an inlet 520 for liquid ingress and a jet outlet 522 through which a liquid jet is upwardly directed towards a rotary irrigation head generally designated 530. A bridge member 532 is integrally formed with the housing 512 extending over two support arms 534.

The rotary irrigation head 530 comprises a reactionary deflection groove 540 formed with an inlet 542 extending axially above the jet outlet 522, and a jet outlet 546 (FIGS. 20 to 25) extending substantially radially with a reaction-generating surface 548 designed for imparting the rotary head 530 with rotary motion upon impinging of a water jet there against as well as axial displacement in an upward direction, as will be discussed hereinafter.

Likewise in connection with the previous embodiment, the sprinkler 500 is a pop-up type and comprises a concealing arrangement composed of a downwardly extending skirt 523 extending from the rotary irrigation head 530 and telescopically received with an upwardly extending skirt 525 fitted to the base of the housing 512.

Upwardly extending from the rotary irrigation head 530 there is a boss 550 supported within a receptacle 552 of a bridge member 532 integrated with the housing and supported over a pair of support arms 534. Boss 550 is axially displaceable along the rotational axis A of the irrigation head 530 and is bushed by a bushing ring 557 to cancel radial tolerances.

The rotary irrigation head 530 is fitted with a pair of first magnets M1 and the bridge member 532 is fitted with a rotary dampening mechanism 578 comprising a sealed chamber 580 accommodating a second magnetic support member 582 fitted with a pair of second magnets M2, said sealed chamber being fitted with a substantially viscous substance 586. It is appreciated that the first magnets M1 and the second magnets M2 are disposed in substantially the same configurations as disclosed hereinabove to thereby impart a repulsion force acting substantially coaxially along the rotary axis A and substantially eliminating moments of force in other directions.

At the normal position of the sprinkler, at the absence of liquid supply, the repulsion forces acting between the magnets M1 and M2, together with force of gravity tend to displace the rotary irrigation head 530 in a downwards direction (FIGS. 18 to 22), wherein the jet outlet 522 and the outlet 546 are concealed thus preventing dirt and insects from entering and possibly interfering with smoother operation of the sprinkler. However, a liquid supplied through the inlet 514 results in a jet emitted through outlet jet 522 generating a reactionary force which will first act to raise the illustrated irrigation head 530 against the gravity force and against the repulsion magnetic force and will further cause the rotary irrigation head to rotate about the rotational axis A (FIGS. 22 to 25).

Figure 26:
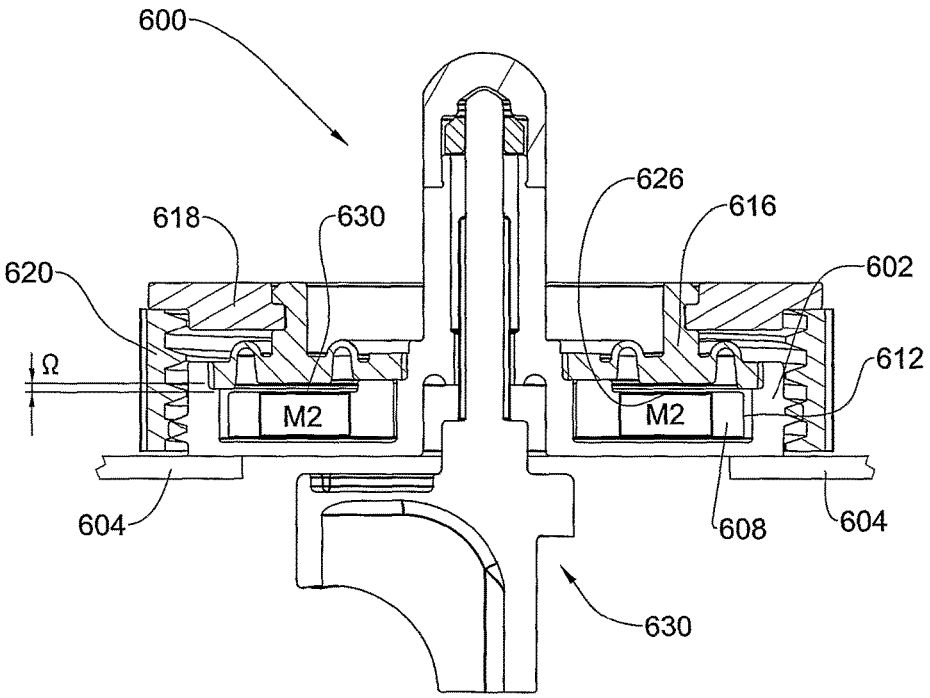

Turning now to FIG. 26 there is illustrated only a rotary dampening mechanism generally designated 600 with a rotary irrigation head 630 articulated thereto. Rotary irrigation head 630 is for example of the type disclosed in connection with the first embodiment of FIGS. 5 to 7 and is fitted with a pair of first magnets M1 (not seen in this figure owing to the angle at which the representative figure is shown). The dampening mechanism 600 comprises a sealed chamber 602 constituting part of a bridge supported by arms 604 to the sprinkler housing. The sealed chamber 602 accommodates a pair of second magnets M2 which like in the previous embodiments are arrangement such that their poles face like poles of the first magnets M1.

The magnets M2 are fixedly received within a second magnet support member 608 the latter embedded within a viscous substance 612 filling the sealed chamber 602.

However, unlike the previous embodiments, the sealed chamber 602 is fitted with a flexible membrane-like top seal member 616 supported by a rigid actuator 618, however sealing the sealing chamber 602. The actuator 618 is engaged to the bridge 604 by a coupling ring 620, and is designed such as to convert rotary motion into axial motion, whereby rotation of the ring 620 entails corresponding axial displacement of the actuator 618 and the associated flexible seal 616, effectively resulting in displacement of a bottom surface 626 of the top seal member 616 upwards and downwards, thus increasing/decreasing the gap designated S between a top surface 630 of the second magnet support member 608 from subsurface 626 thereby effecting the sheer force residing between the second magnet support member 608 and viscous chamber at 612 in a manner so as to increase/decrease the resistance to rotation thereof, which will effectively result the rotational speed of the irrigation head.

Turning now to FIGS. 27 to 30 there is illustrated yet another embodiment of a sprinkler in accordance with the present invention wherein like elements have been designated with like reference numerals as in connection with the first embodiment hereinabove, however shifted by 700.

The sprinkler, generally designated 700, comprises a housing 712 formed with an inlet liquid port 714 connectable to a liquid irrigation supply line (not shown) e.g. by threaded neck portion 716. A jet forming nozzle 718 (FIGS. 29 and 30) is secured within the housing, extending from the inlet port 714 and is formed with an inlet 720, for liquid ingress, and a jet outlet 722 through which a jet is upwardly directed towards a rotary irrigation head generally designated 730. A bridge member 732 is integrally formed with the housing 712, extending over two support arms 734 having a blade-like cross section, as discussed hereinabove, to thereby cause minimal interference with a jet emitted from the rotary sprinkler head 730.

The rotary irrigation head 730 comprises a reactionary deflection groove 740 formed with an inlet 752 extending axially above the jet outlet 722, and a jet outlet 746 (best seen in FIG. 28) extending substantially radially, with a reaction-generating surface 748 designed for imparting the rotary head 730 with rotary motion upon impinging of a water jet there against, as well as axial displacement in an upward direction (FIGS. 27B to 30) as discussed in connection with the position embodiments. The sprinkler of FIGS. 27 to 30 is a pop-up type sprinkler and comprises a concealing arrangement for concealing the rotary irrigation head, thereby preventing dirt and insects from entering the outlet nozzle and the jet outlet. The concealing arrangement is composed of a downwardly extending skirt 723 extending from the irrigation head 730, and telescopically received within an upwardly extending skirt 725 fitted to the base of the housing 712 or integrally formed therewith. Upwardly extending from the rotary irrigation head 730 there is an integral boss 750 supported within a receptacle 752. The boss 750 is axially displaceable along the rotational axis A of the irrigation head 730 and is bushed by a bushing ring 751 constituting part of a sealing plate 753 sealingly secured to the sealed chamber 780 at a bottom site thereof.

Figure 27A:
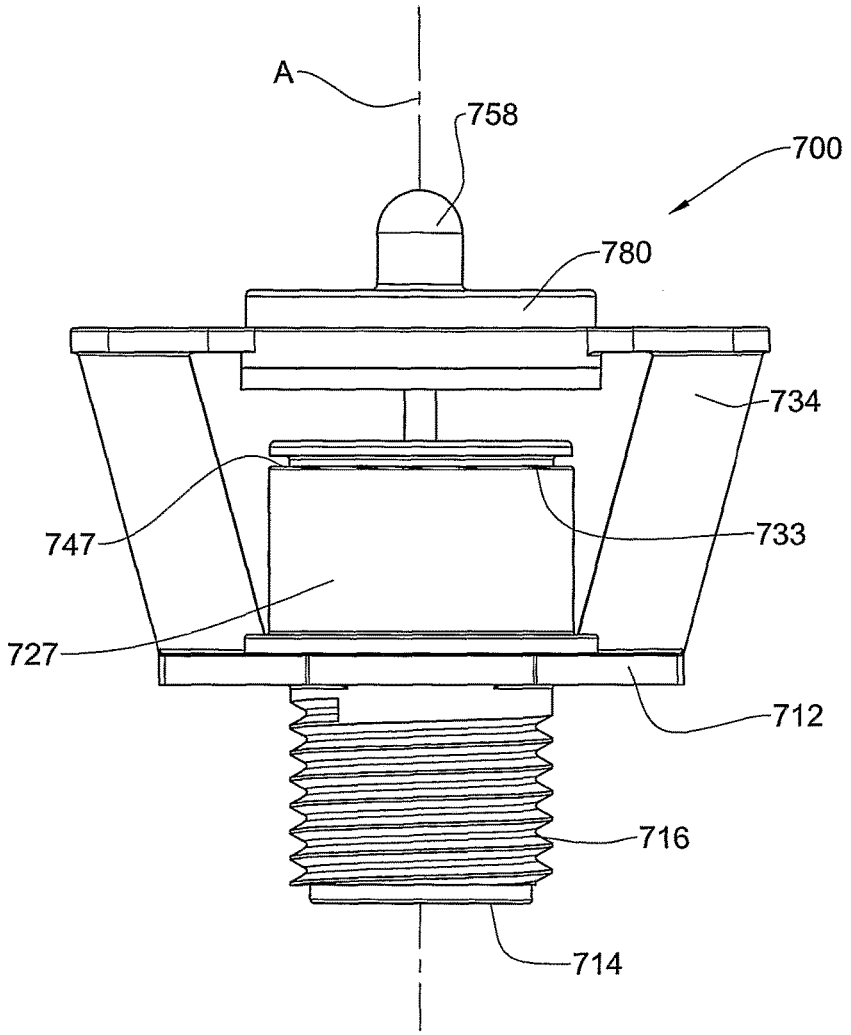
FIG. 27A is a sprinkler in accordance with yet another embodiment of the drawings, at its closed, non-operative position.
Figure 27B:
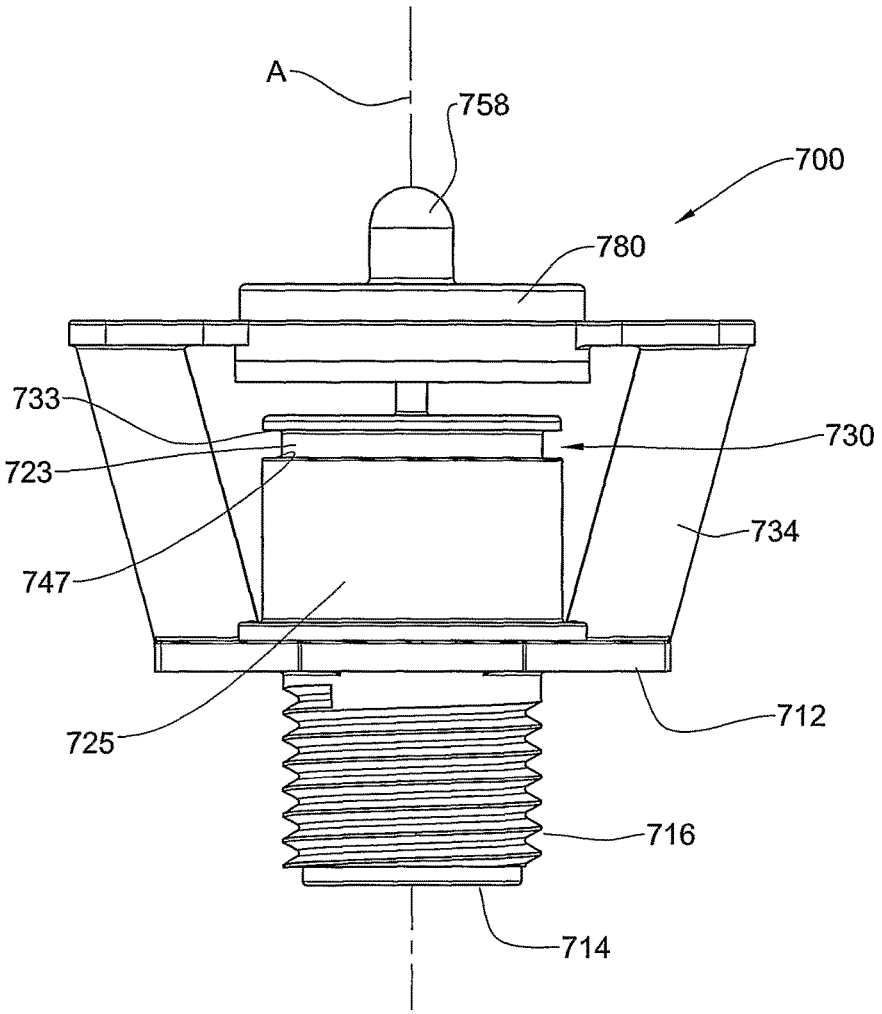
FIG. 27B is a front view of a sprinkler in accordance with a modification of the present invention, in a pop-up position.

The arrangement is such that the rotary irrigation head 730 is rotatably secured and is axially displaceable between its closed, non-operative position of FIG. 27A, and an open, operative position wherein the rotary irrigation head 730 is axially displaced upwardly (FIGS. 27B to 30) whereby the outlet nozzle 746 is exposed over an upper rim 747 of the skirt 725.

It is noted that the rotary irrigation head 730 is formed with an annular rim 733 which at the closed position (FIG. 27A) comes to rest over the upper edge 747 in a sealing manner, owing to gravity force and repulsion force between the first magnets M1 and the second magnets M2

The rotary irrigation head 730 is fitted with a pair of first magnets M1 and similar to the disclosure of the previous embodiments, a rotary dampening mechanism generally designated 778 comprises a sealed chamber 780 rotatably accommodating a second magnet support member 782 accommodating a pair of second magnets M2 fixed thereto as disclosed in connection with the previous embodiments. It is appreciated that the first magnets M1 and the second magnets M2 are axially disposed with their like poles facing each other. The sealed chamber 780 is filled with a viscous substance whereby the second magnet support member 782 is prevented from freely rotating within the sealed chamber 780.

Figure 28:
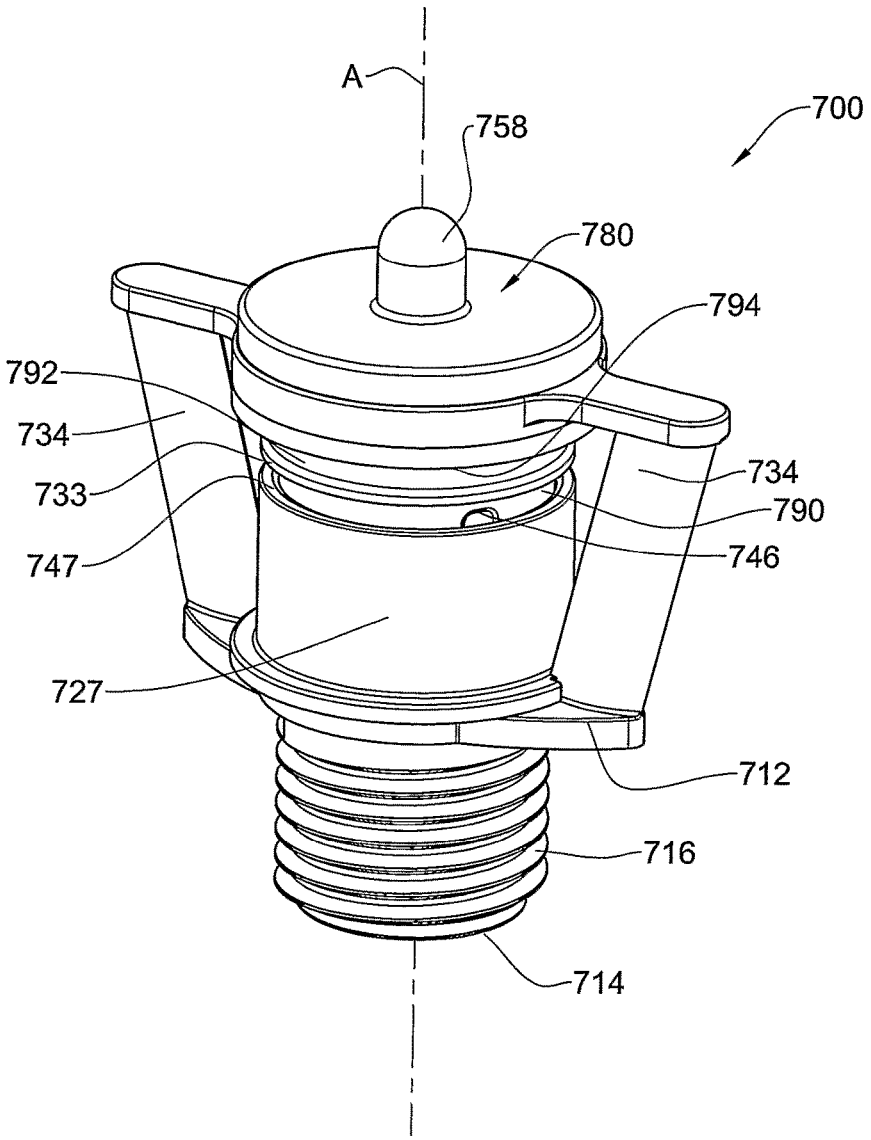
Figure 29:
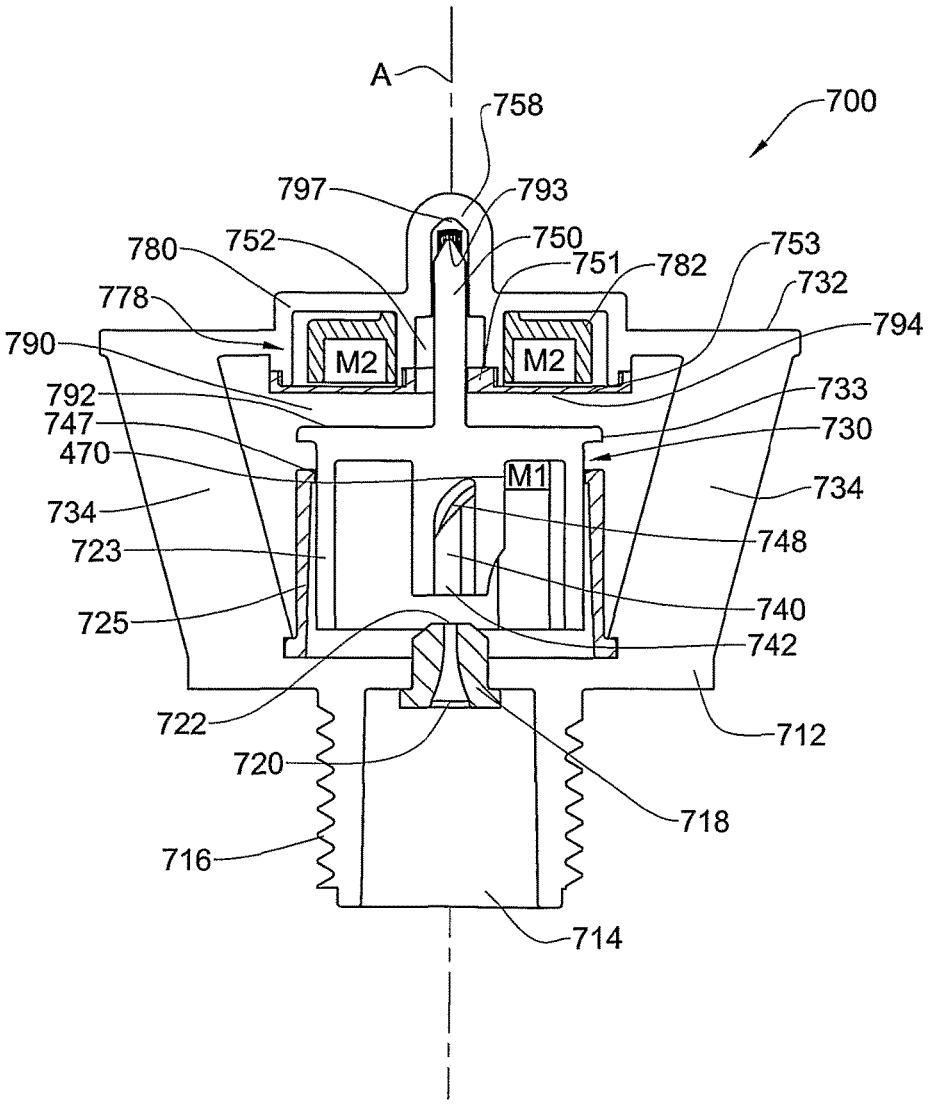
Figure 30:
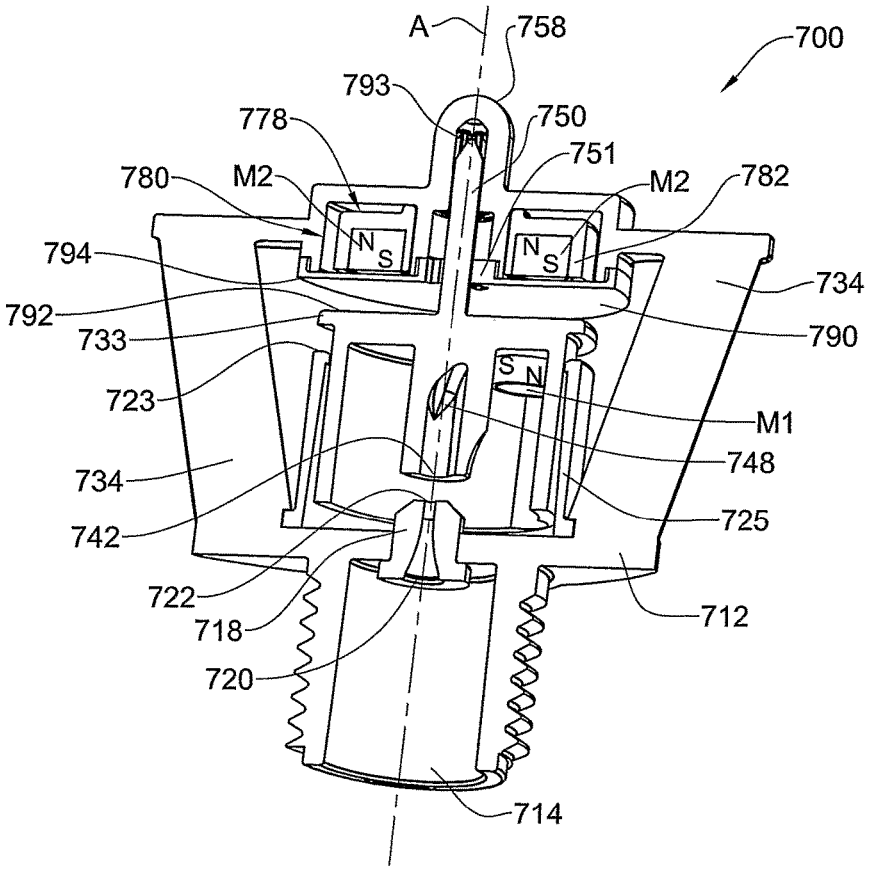

A liquid jet emitted through jet outlet 722 at a first instance causes the irrigation head 730 to raise to the position illustrated in FIG. 28, wherein the outlet nozzle 746 extends above the top rim 747 of skirt 725, simultaneously causing the irrigation head 730 to rotate, owing to reactionary forces developed by the liquid impinging against the deflection surface 748. The irrigation head 730 raises to a maximum axial displacement (FIGS. 27B-30) leaving an interstice 790 between [the] *a* top surface 792 of the [magnet support 270] *irrigation head 730* and a bottom surface 794 of the sealed chamber 780, thus *preventing* particles from accumulating in that space and interrupting [with] proper operation of the sprinkler.

FIGS. 31 through 38C are directed to a modification of a sprinkler in accordance with the present invention which for sake of clarity is of the type disclosed in connection with the first embodiment depicted in FIGS. 5 to 7B however, with the respective differences as will be discussed hereinafter. For sake of clarity, the present embodiment is designated with like elements as in the first embodiment wherein like elements have been designated like reference numbers shifted by 800.

Figure 31:
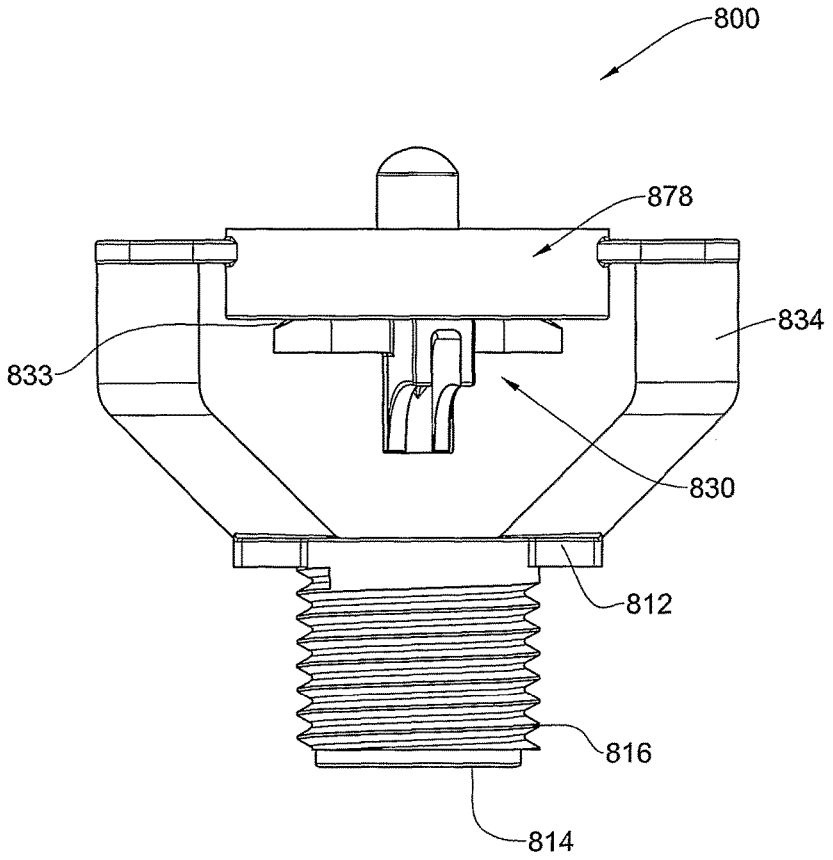
Figure 32:
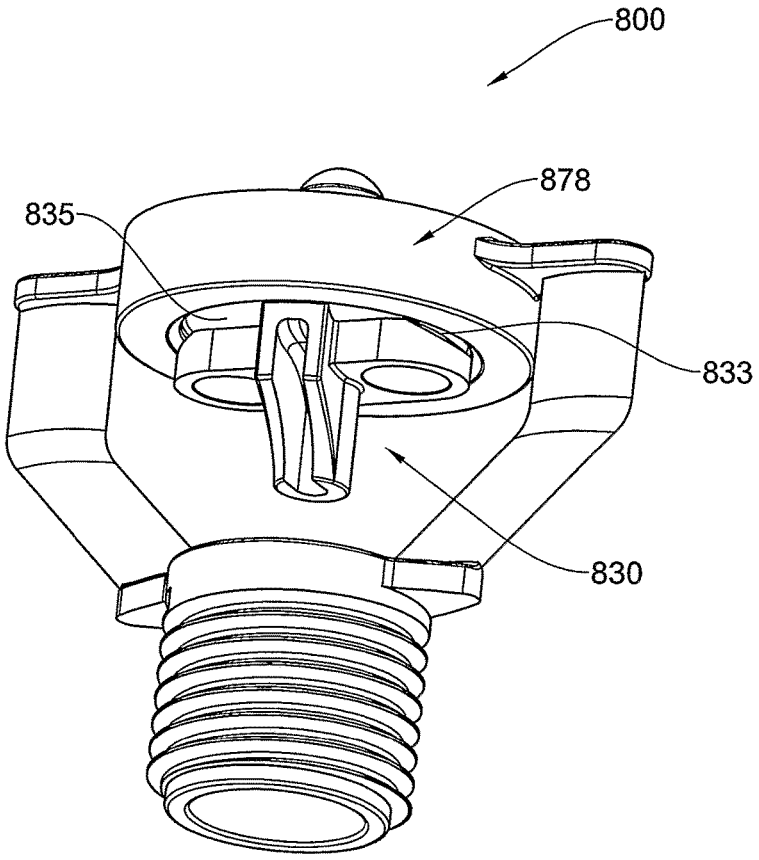
Figure 33A:
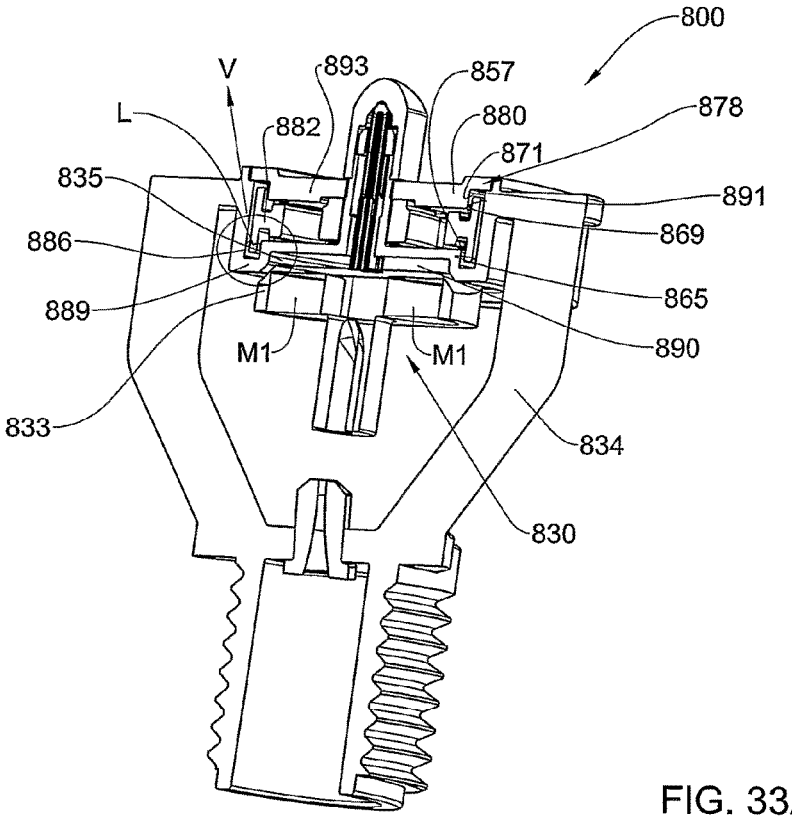
FIG. 33A is a longitudinal section of FIG. 28.
Figure 33B:
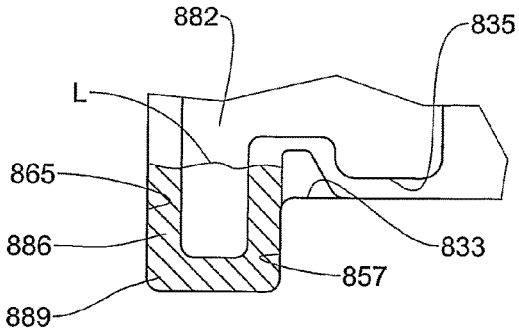
FIG. 33B is an enlargement of the portion marked V in FIG. 32A.

The sprinkler 800 is principally similar to that disclosed in connection with the first embodiment but nevertheless comprises several differences concerned with the rotary irrigation head and 830 and in particular with the dampening mechanism generally designated at 878 and as can best be seen in the sectioned FIGS. 31 to 33.

A first difference is noticed by reducing the overall size of the sprinkler 800 by its compacting wherein the rotary irrigation head 830 is fitted at its top end with chamfered edges 833 wherein the bridge portion constituting the dampening mechanism 878 is formed at its bottom side with an indention 835 whereby the rotary irrigation head 830 is partially received there within, however maintaining a gap 890 therebetween.

Yet another difference resides in the dampening mechanism 878 rendering the sprinkler 800 suitable for operating in an upright position (FIGS. 31 to 35), or at an inverted position, namely heads down ('bottoms-up'), as in FIG. 37, as will be discussed hereinafter in further detail.

Apart for these differences, the sprinkler 800 is constructed and operates similar to the principles disclosed in connection with FIGS. 5 to 8.

Figure 34:
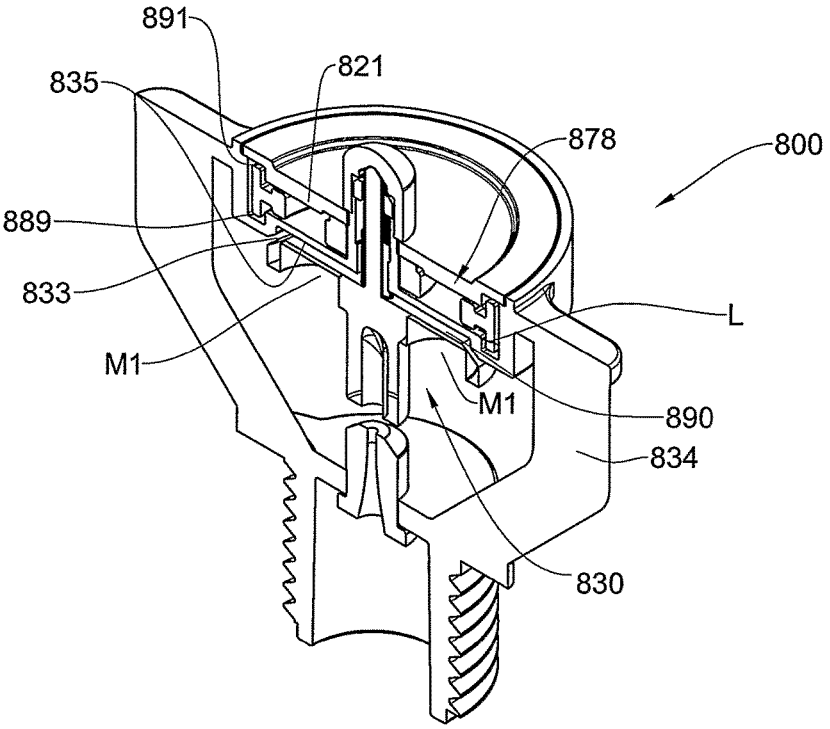
Figure 35:
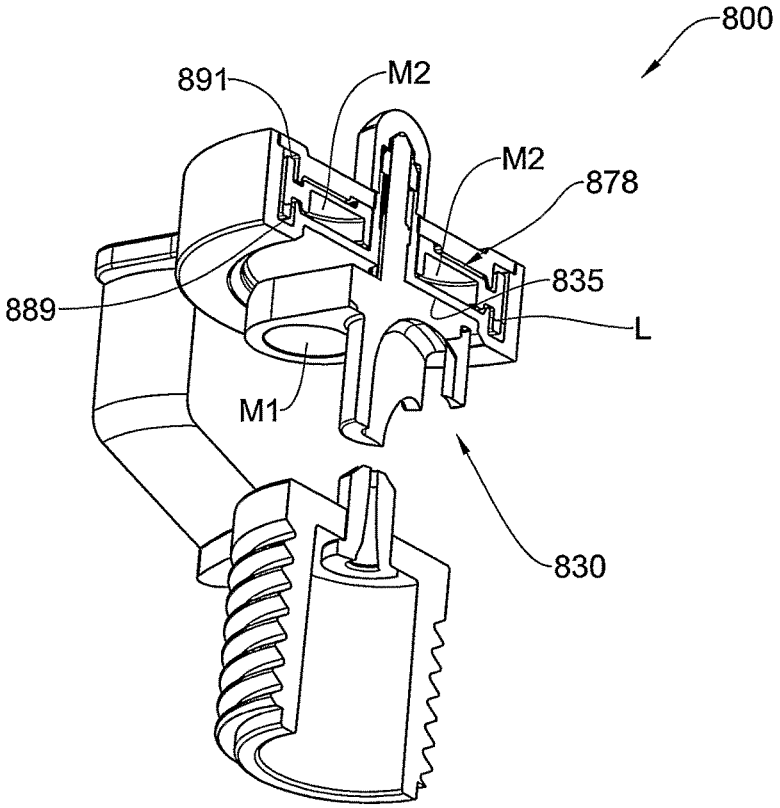
Figure 36A:
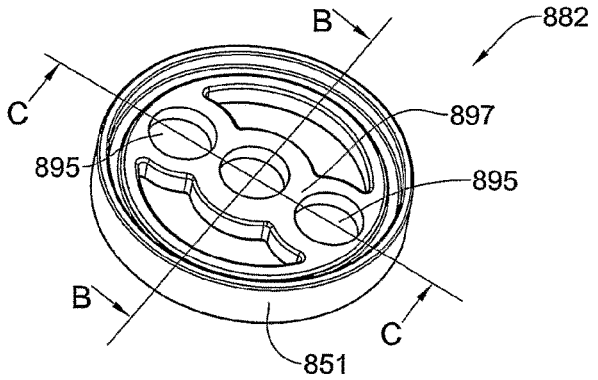
FIG. 36A is a top respective view of a second magnet support used in the sprinkler in accordance with the embodiment of FIG. 27.
Figure 36B:
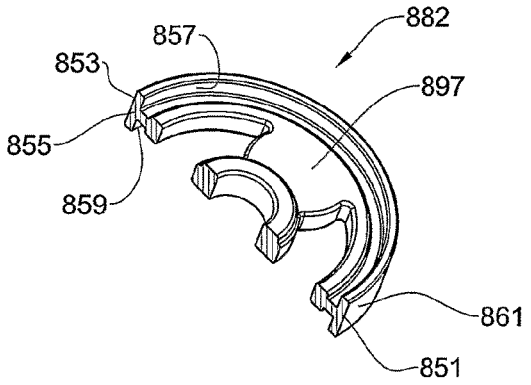
FIGS. 36B and 36C are sections taken along lines B-B and C-C, respectively, in FIG. 32A.
Figure 36C:
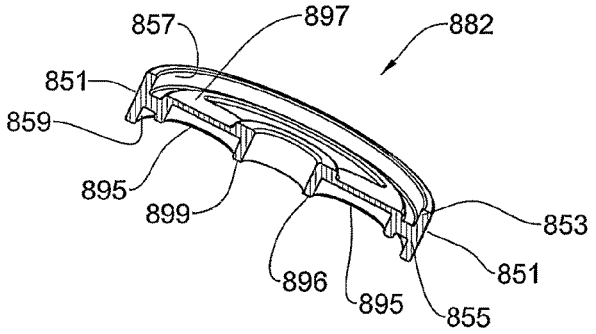

As can further be seen in FIGS. 33 to 35, the dampening mechanism 878 is formed with a sealed chamber 880 fitted with a disk-like second magnet support member 882 seen in FIGS. 36A to 36C. The sealed chamber 880 is filled with a viscous substance 886 to an extent that it occupies a peripheral annular groove 889 formed in the sealed chamber 880. As will be discussed hereinafter, a corresponding groove 891 is formed at the top cover 893 of the sealed chamber 880, for a purpose to become apparent hereinafter.

Turning now to FIGS. 36A to 36C, the second magnet support member 882 is formed with two receptacles 895, the arrangement being such that two second magnets M2 (not seen in FIGS. 36A-36C) are press-fit and securely sealed within apertures 895, the arrangement being such that the faces of the magnets M2 are substantially flush with the respective top surface 897 and bottom surface 899 of the second magnet support member 882. It is further noticed that the second magnet support member 882 is formed with a peripheral T-like shaped rim designated 851 having an upwardly extending rim 853 and a downwardly extending rim portion 853 and downwardly extending rim portion 855 wherein the upwardly extending rim portion 853 is received at the assembled position within the annular groove 891 and likewise, the downward rim 855 is received within the lower annular groove 889 of the sealed chamber 880.

The above disclosed arrangement shifts the shearing plane from the substantially horizontal plane (of the top and bottom surfaces of the second magnet support member 882) to substantially axial planes namely inner wall surfaces 857 and 859 and outside wall surface 861 of the T-like annular rim with respect to corresponding sidewalls 865 and 857, 869 and 871 of the bottom groove 889 and the top groove 891, respectively. Likewise, the viscous fluid extends in an annular path rather than over a plane.

In accordance with this embodiment, the viscous substance received within the annular groove 889 extends within the groove at a level designated L.

Figure 37:
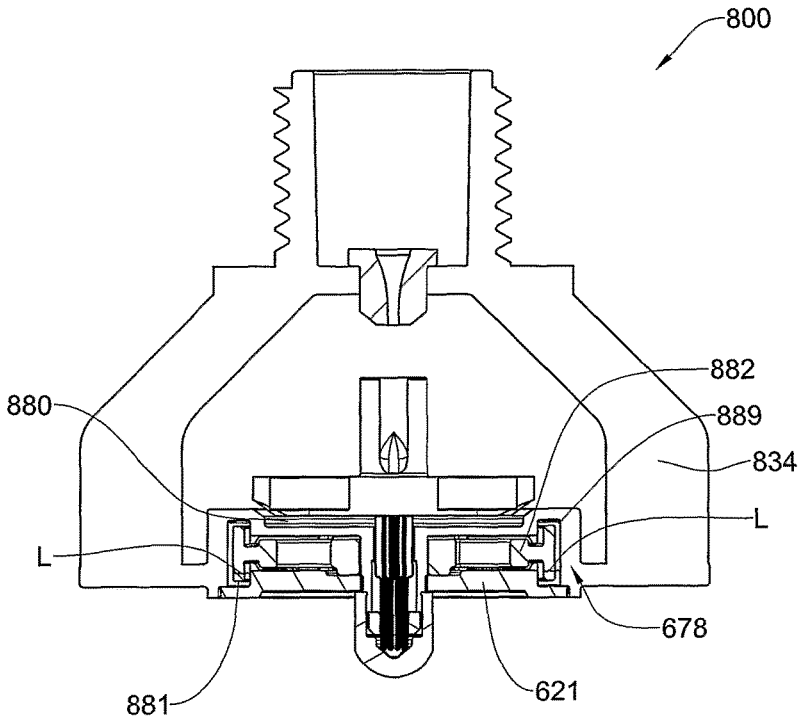

An advantage of the above structure is apparent from FIG. 37 wherein the sprinkler 800 is illustrated in an inverted position namely upside down suitable for suspension. In this case, the viscous substance (e.g. silicon gel, etc.) will gather within the peripheral groove 899 filling the groove to level L where shear forces act against the substantially vertically extending sidewalls of the T-like annular rim 851 and versus the corresponding sidewalls of the annular rim 891.

Figure 38A:
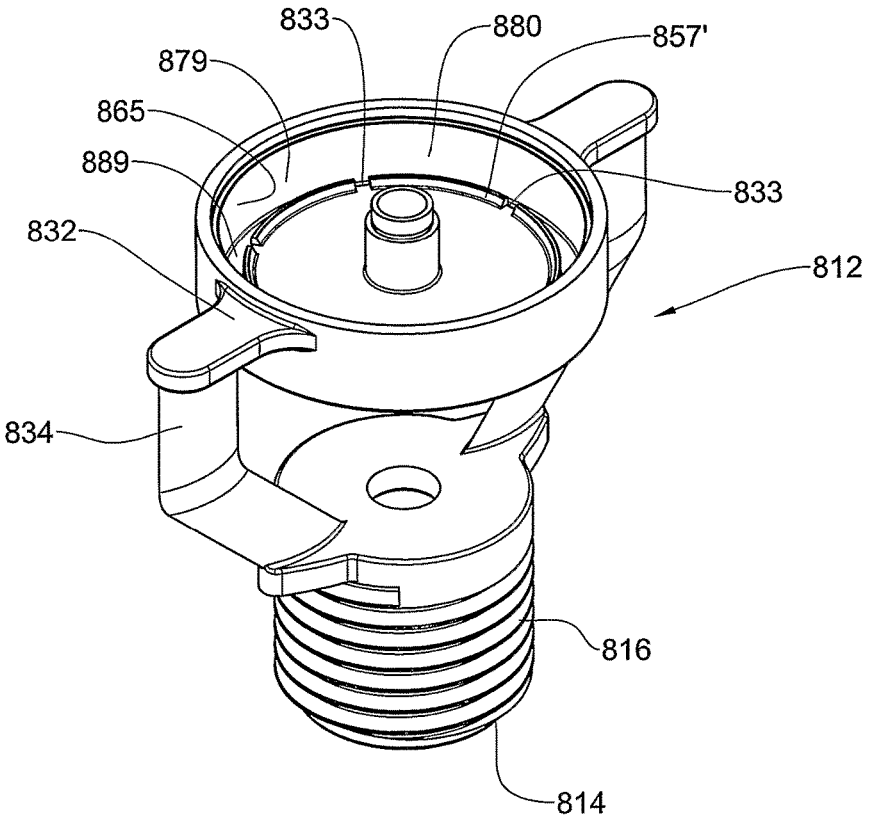
FIG. 38A is a top isometric view of the housing of the sprinkler of FIG. 27.
Figure 38B:
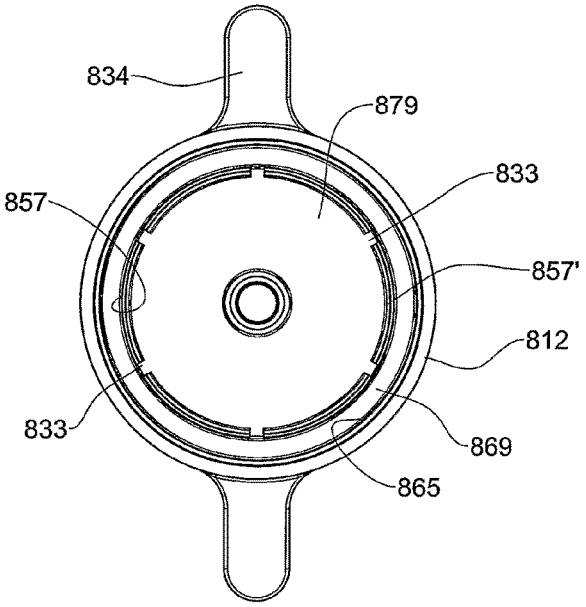
FIG. 38B is a top view of the sprinkler housing of FIG. 34A.
Figure 38C:
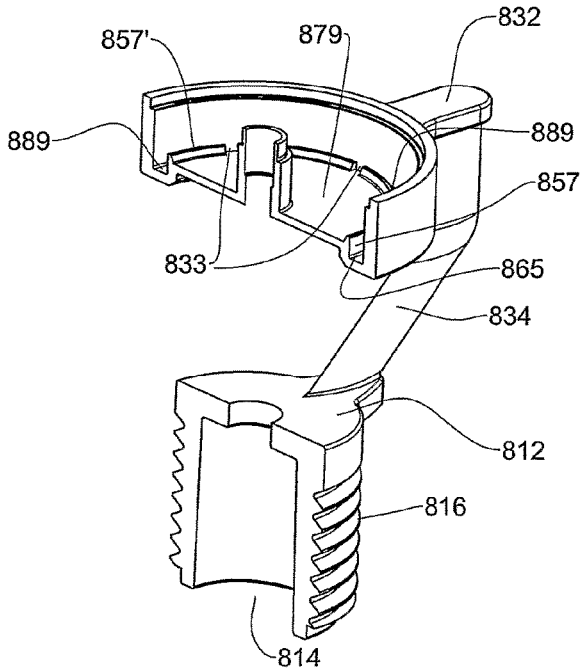
FIG. 38C is a sectioned isometric view of the housing of FIG. 34A.
Figure 39:
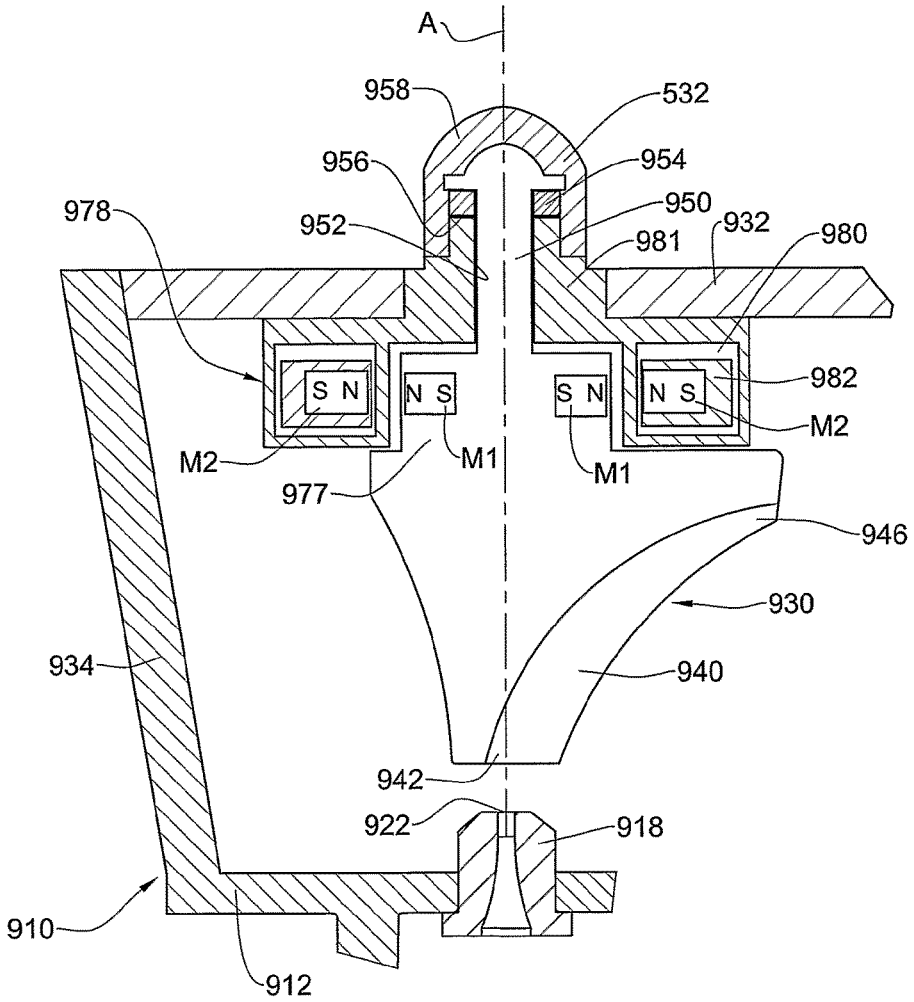

Turning now to FIGS. 38A to 38C there is illustrated an alternative housing useful in particular for a sprinkler such as sprinkler [260] *800* illustrated in FIGS. 31 to 37. The housing generally designated 812 is substantially similar to previously disclosed housings, in particular that of FIGS. 5 to 7. The housing is formed with a receptacle 879 for receiving the dampening mechanism (878 in FIG. 33) wherein in this particular embodiment, the annular rim 857' (constituting the inner wall of the annular groove 889) is formed with a plurality of radially extending grooves 833 forming a draining channel for draining viscous substance from the well-like receptacle 879 towards the annular groove 889, thereby ensuring efficient shear in substantially vertical planes, as discussed hereinabove. It is appreciated that likewise, the top cover 821 may be formed with radial draining grooves similar to grooves [633] *833* disclosed in connection with the [well 679] *well-like receptacle 879* of the sealed chamber.

In the embodiments discussed hereinabove the first magnets M1 and the second magnets M2 are axially distributed, namely extend at different level along the axial axis of the sprinkler, however arranged with like poles facing each other so as to generate a repulsion force therebetween. In the embodiment illustrated in FIG. 39 there is presented a sprinkler wherein the first magnets M1 and the second magnets M2 are radially distributed.

For sake of clarity, the present embodiment is designated with like elements as in the first embodiment wherein like elements have been designated like reference numbers shifted by 900.

The rotary sprinkler generally designated 910 comprises a housing 912 integrally formed with a bridge member 932 extending over two support arms 934 disposed in a V-like configuration. An irrigation head 930 is a swivel-type irrigator formed with a reaction generating deflection groove 940 having an inlet end 942 extending substantially vertically above an outlet 922 of the jet forming nozzle 918, and an outlet opening 946 extending substantially radially, with a reaction generating surface 948 designed for imparting the rotary head 930 with rotary motion upon impinging of a water jet emitted from the jet forming nozzle 918 thereupon.

The irrigation head 930 is fitted with an upwardly extending boss 950 extending into an aperture 952 formed in the bridge 932 and axially retained in place by means of a retention ring 954 however free to rotate about longitudinal axis (rotary axis A). It is noticed that the retention ring 954 rests over an axial projection 956 extending from the bridge member 981. The retention arrangement is concealed by a cap 958.

Formed with the irrigation head 930 is a magnet housing 977 comprising two magnets designated M1. The magnets M1 are fixedly positioned within the magnet housing 977 and are arranged such that like poles thereof face each other. In the present example, the magnets M1 are radially disposed over the diameter of the magnet housing 977, and the south pole of the two magnets M1 face radially inwards.

A pair of second magnets M2 are secured within a second magnet support member 982 which in turn is rotatably received within a sealed chamber 980 filled with a viscous substance, constituting together a rotary dampening mechanism generally designated 978. The second magnets M2 are radially disposed over the diameter of the second magnet support 982 and arranged such that like poles thereof face like poles of the first magnets M1, namely where the south pole of the two magnets M2 face radially outwards. The magnets M1 and M2 are disposed substantially co-planer giving rise to generating a repulsion force between the first magnets M1 and the second magnets M2.

Operation of the sprinkler according to this embodiment is principally similar to that disclosed in connection with the previous embodiments. Accordingly, a water jet from the jet forming nozzle 918 impinges of the reaction generating surface 948, rendering the irrigation head 930 rotary motion about the longitudinal axis A, together with the articulated first magnets M1. As a result of rotation of the first magnets M1 the second magnets M2 attempt to rotate, under repulsion force residing between the pairs of magnets M1 and M2, respectively. However, the dampening mechanism 978 significantly slows the rotary motion of the second magnet support 982, resulting in corresponding dampening (slowing) of the revolution of the irrigation head 930.

Those skilled in the art to which this invention pertains will readily appreciate that numerous changes, variations, and modifications can be made without departing from the scope of the invention, mutatis mutandis.

The invention claimed is:

1. A rotary sprinkler comprising a housing, a rotatable irrigation head fitted with a rotary dampening mechanism and associated with a first magnet assembly, said dampening mechanism being configured for resisting movement of said [first magnet assembly] *rotatable irrigation head*; a second magnet assembly associated with the housing; said first magnet assembly and said second magnet assembly [are] *being* arranged with like poles facing each other so as to generate a repulsion force therebetween, wherein, at least during operation of the sprinkler, said first magnet assembly and said second magnet assembly are in a state of static magnetic equilibrium.

2. The rotary sprinkler according to claim 1, where the housing is formed with a liquid inlet port and a jet forming nozzle extending opposite said rotatable irrigation head, said housing further comprising a bridge with a magnet support fixedly fitted with said second magnet assembly, said bridge rotationally supporting said irrigation head which comprises said first magnet assembly.

3. The rotary sprinkler according to claim 1, wherein said second magnet assembly comprises at least a pair of magnets axially positioned with respect to one another and the first magnet assembly is in the form of a magnet [which extends axially symmetrically] between said pair of [first] magnets, at a magnetic force equilibrium.

4. The rotary sprinkler according to claim 1, wherein said first magnet assembly comprises at least a first magnet and said second magnet assembly comprises at least a second magnet, said first magnet and said second magnet [are] *being* substantially equally radially offset from a rotary axis of the irrigation head.

5. The rotary sprinkler according to claim 1, wherein the first magnet assembly is displaceable within a sealed chamber filled with a viscous substance, said chamber constituting the dampening mechanism, and comprising a holder being configured for retaining the first magnet *assembly* at a fixed distance from [the] *an* axis of rotation and facilitating only rotary displacement thereof.

6. The rotary sprinkler according to claim 1, wherein magnets of the second magnet assembly are fixedly articulated to the housing.

7. The rotary sprinkler according to claim 1, wherein said first magnet assembly comprises at least a first magnet and said second magnet assembly comprises at least a second magnet, said first magnet and said second magnet [are axially positioned] *being axially offset* with respect to one another.

8. The rotary sprinkler according to claim 1, wherein the sprinkler is [fitted] *configured* for either heads-up or bottoms-up orientation.

9. The rotary sprinkler according to claim 1, wherein the number of [first] magnets [of] *in* said first magnet assembly corresponds with the number of [second] magnets [of] *in* the second magnet assembly.

10. The rotary sprinkler according to claim 1, wherein [the] *a* first magnet of the first magnet assembly and [the] *a* second magnet of the second magnet assembly have substantially the same magnetic force.

11. The rotary sprinkler according to claim 2, wherein the irrigation head is fitted with a support boss retained by the bridge and having an axial degree of freedom such that the irrigation head is axially displaceable between a downward, non-operative position and an upper, operative position.

12. The rotary sprinkler according to claim 11, wherein when the irrigation head is [at its] *in said* downward, non-operative position it conceals the jet forming nozzle.

13. The rotary sprinkler according to claim 11, wherein at least one of the irrigation head and the jet forming nozzle is fitted with a peripheral skirt portion for concealing an outlet of the jet forming nozzle and an outlet of a jet emitting portion of the irrigation head, when the irrigation head is [at] *in* the downward, non-operative position.

14. The rotary sprinkler according to claim 13, wherein the irrigation head is fitted with a skirt portion and the jet forming nozzle is fitted with a fixed skirt portion, said skirt portions being coaxial and having different dimensions, whereby [at] *in* the non-operative position said skirt portions at least partially overlap.

15. The rotary sprinkler according to claim 2, wherein the [at least one] first magnet *assembly* is fixed on a magnet support member which is secured to the bridge in a rotatable fashion and is in turn engageable for rotation with the irrigation head.

16. The rotary sprinkler according to claim 15, wherein the magnet support member engages with the irrigation head upon axial displacement of the irrigation head from a downward, non-operative position to an upper, operative position.

17. The rotary sprinkler according to claim 15, wherein rotary engagement between the magnet support member and the irrigation head is facilitated by a helical path formed in one of the magnet support member and the irrigation head and a corresponding helical coupler formed in another of the magnet support member and the irrigation head, whereby axial ascending of the irrigation head entails postponed [rotary] *rotation* of the magnet support member.

18. The rotary sprinkler according to claim 2, wherein the [at least one] first magnet *assembly* and the [at least one] second magnet *assembly* are received in respective magnet holders which are detachably attachable to the irrigation head and *said* bridge, respectively.

19. The rotary sprinkler according to claim 1, wherein the repulsion force is coaxial with a rotary axis of the sprinkler and acts to bias the irrigation head in a direction opposite an axial force applied on the irrigation head by a liquid jet.

* * * * *